Feb. 16, 1937.   M. ROMAINE ET AL   2,070,808
MILLING MACHINE TRANSMISSION AND CONTROL MECHANISM
Filed Jan. 3, 1934   10 Sheets-Sheet 1

Inventor
MILLARD ROMAINE
WALTER D. ARCHEA
ERWIN G. ROEHM

By A. K. Parsons
Attorney

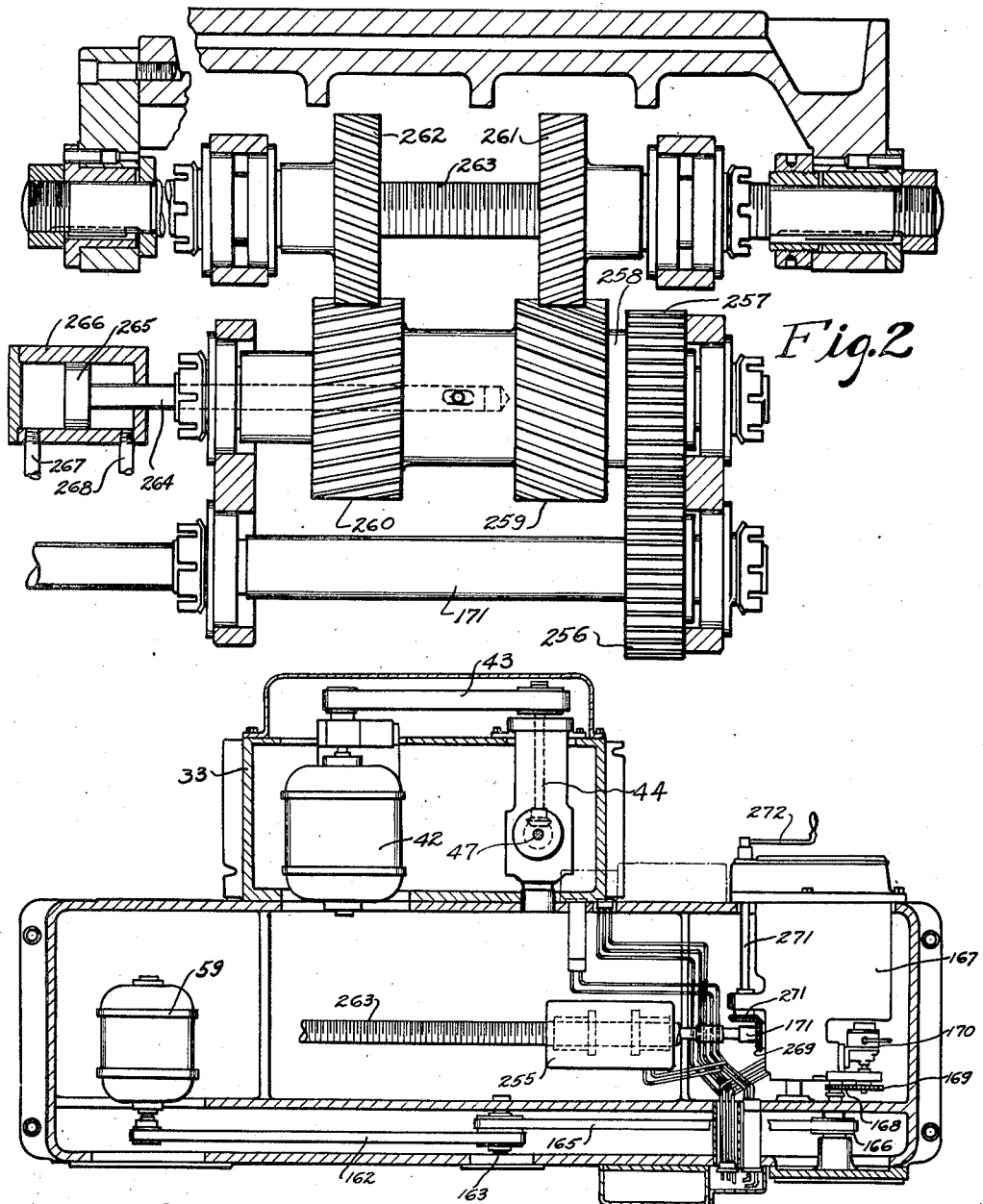

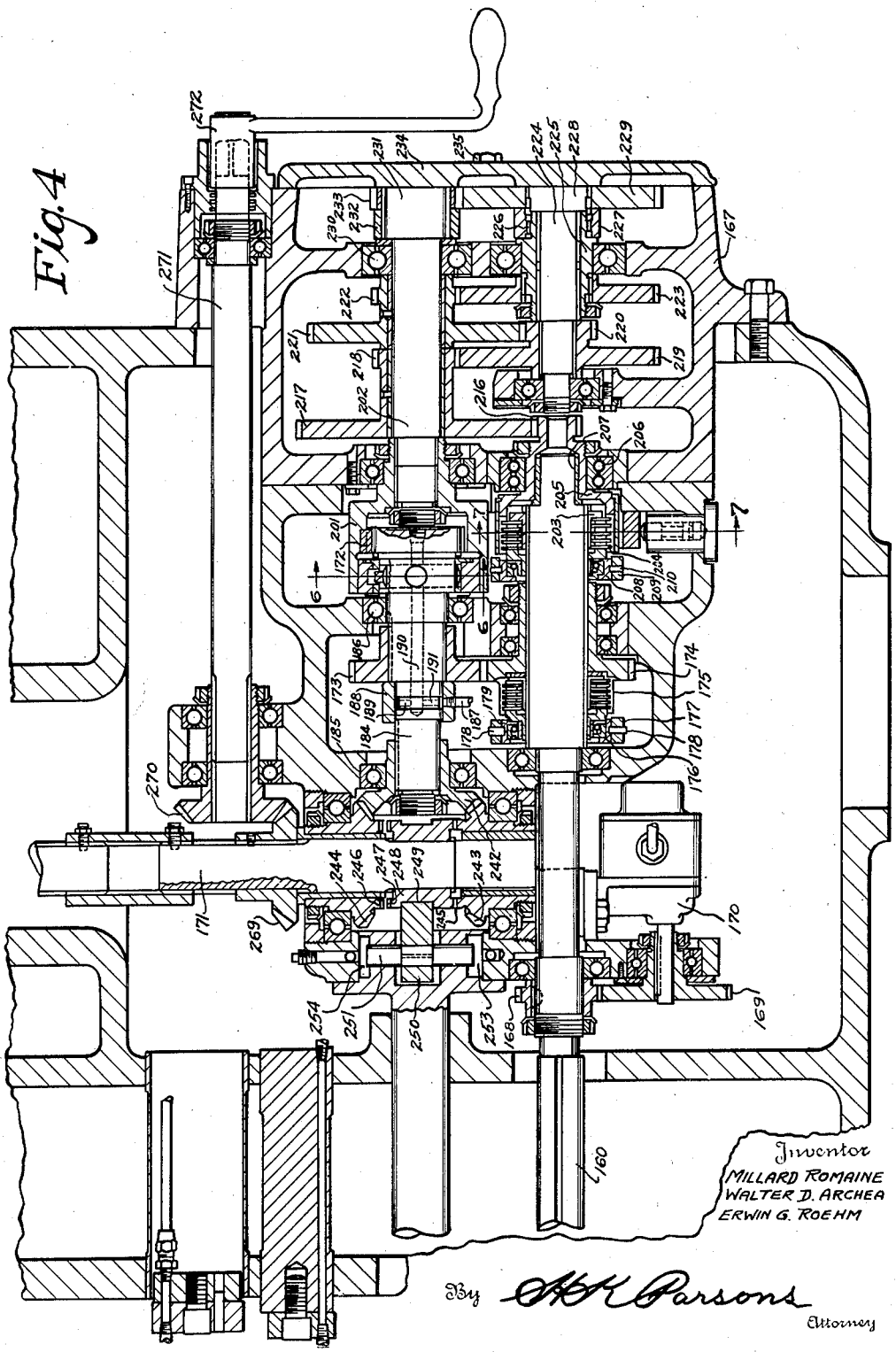

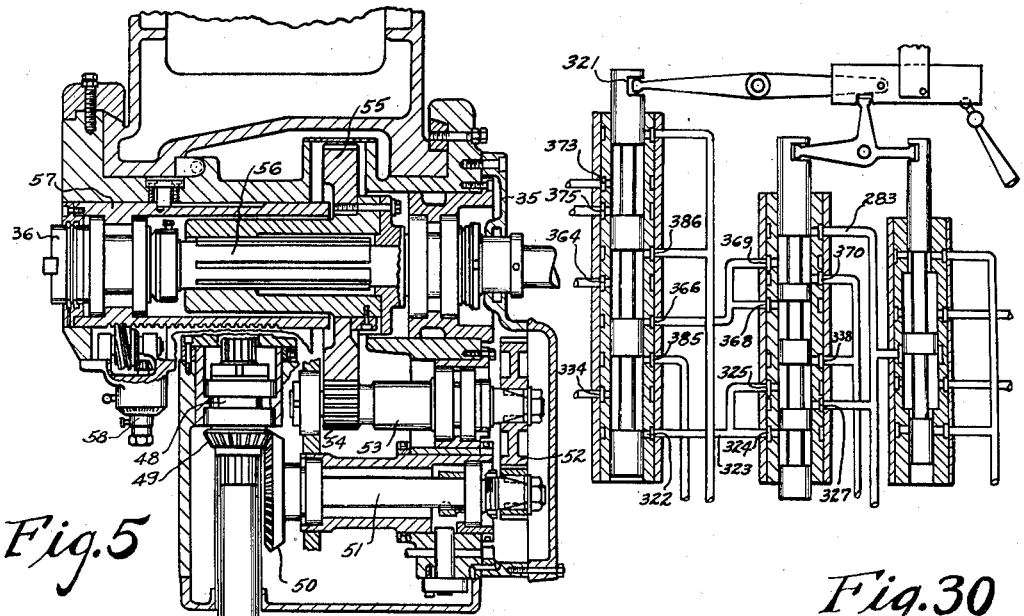
Fig.5
Fig.30
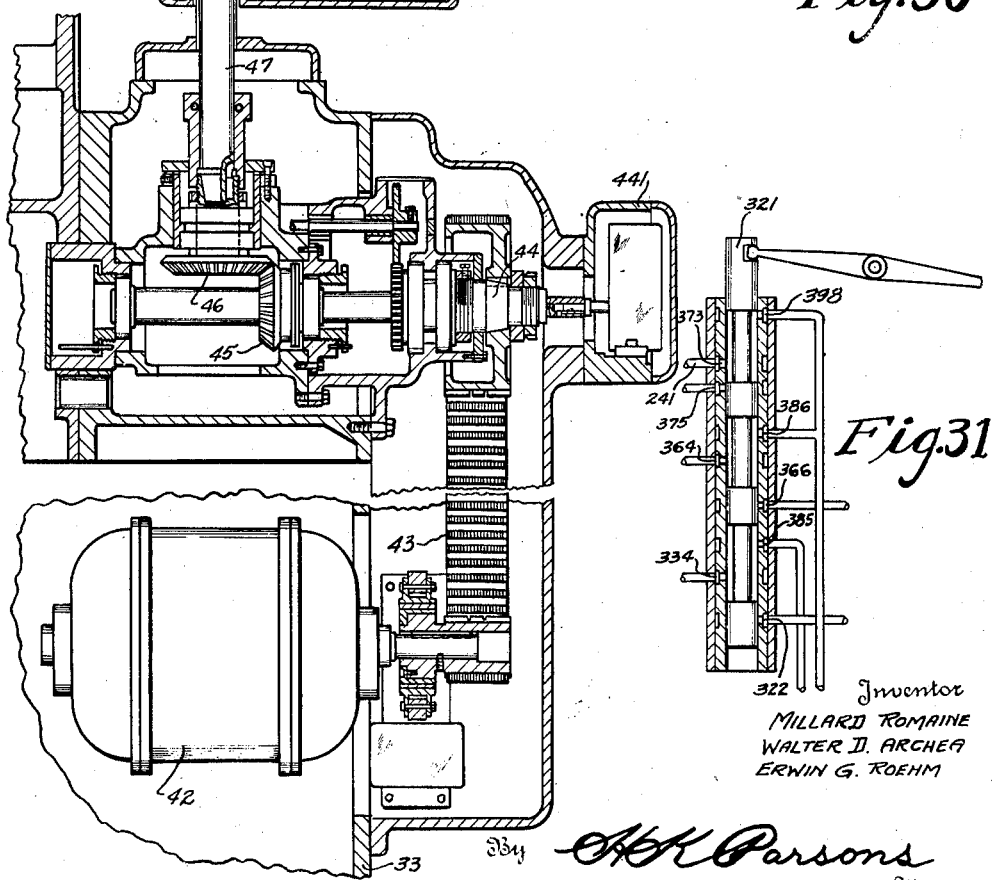
Fig.31
Inventor
MILLARD ROMAINE
WALTER D. ARCHER
ERWIN G. ROEHM
By A.K. Parsons
Attorney Feb. 16, 1937.  M. ROMAINE ET AL  2,070,808
MILLING MACHINE TRANSMISSION AND CONTROL MECHANISM
Filed Jan. 3, 1934  10 Sheets—Sheet 5
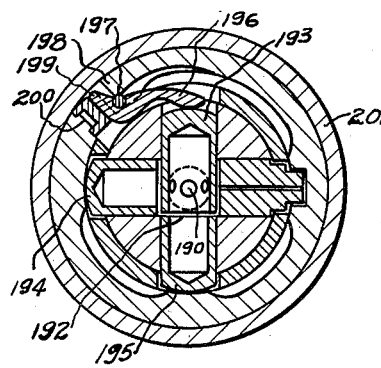
Fig. 6
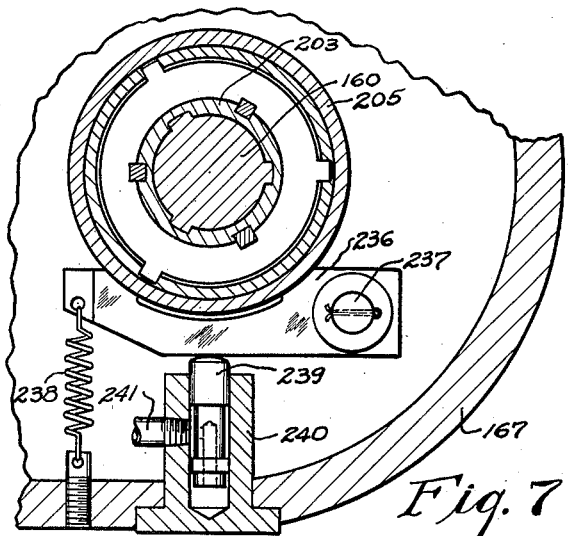
Fig. 7
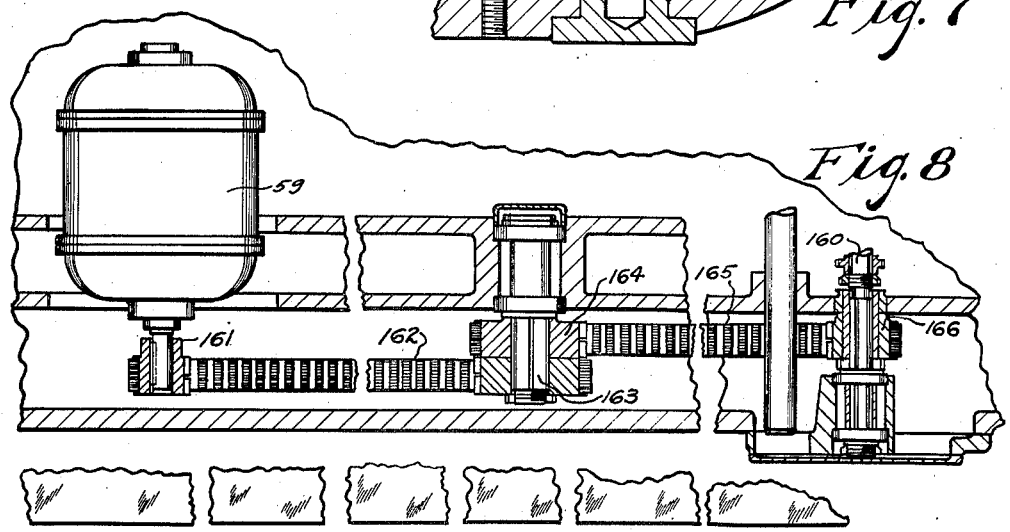
Fig. 8
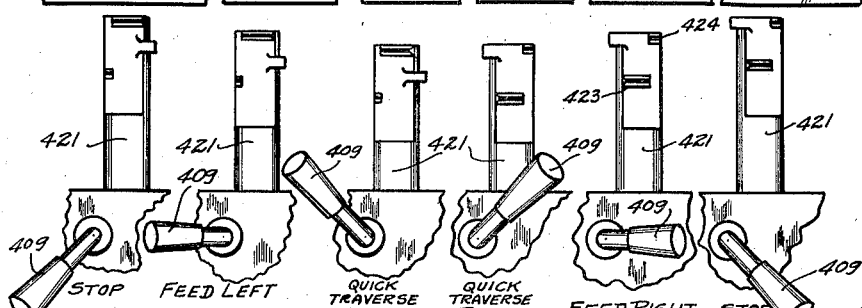
Fig. 9 STOP  Fig. 10 FEED LEFT  Fig. 11 QUICK TRAVERSE LEFT  Fig. 12 QUICK TRAVERSE RIGHT  Fig. 13 FEED RIGHT  Fig. 14 STOP
Inventor
MILLARD ROMAINE
WALTER D. ARCHER
ERWIN G. ROEHM
By A. K. Parsons
Attorney Feb. 16, 1937.  M. ROMAINE ET AL  2,070,808
MILLING MACHINE TRANSMISSION AND CONTROL MECHANISM
Filed Jan. 3, 1934  10 Sheets-Sheet 6

Inventor
MILLARD ROMAINE
WALTER D. ARCHEA
ERWIN G. ROEHM
By AHK Parsons
Attorney Inventor
MILLARD ROMAINE
WALTER D. ARCHEA
ERWIN G. ROEHM
By AHKParsons
Attorney

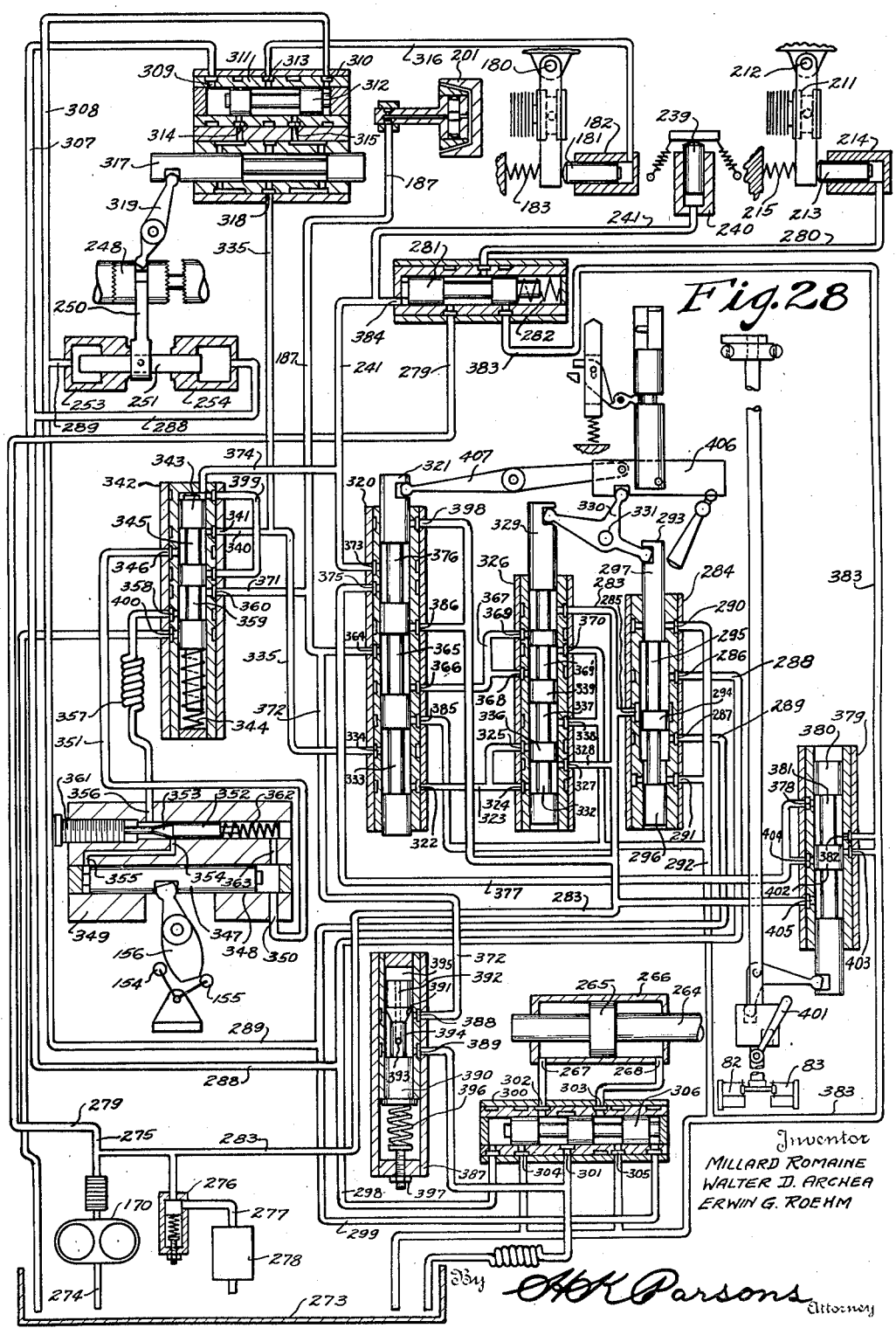

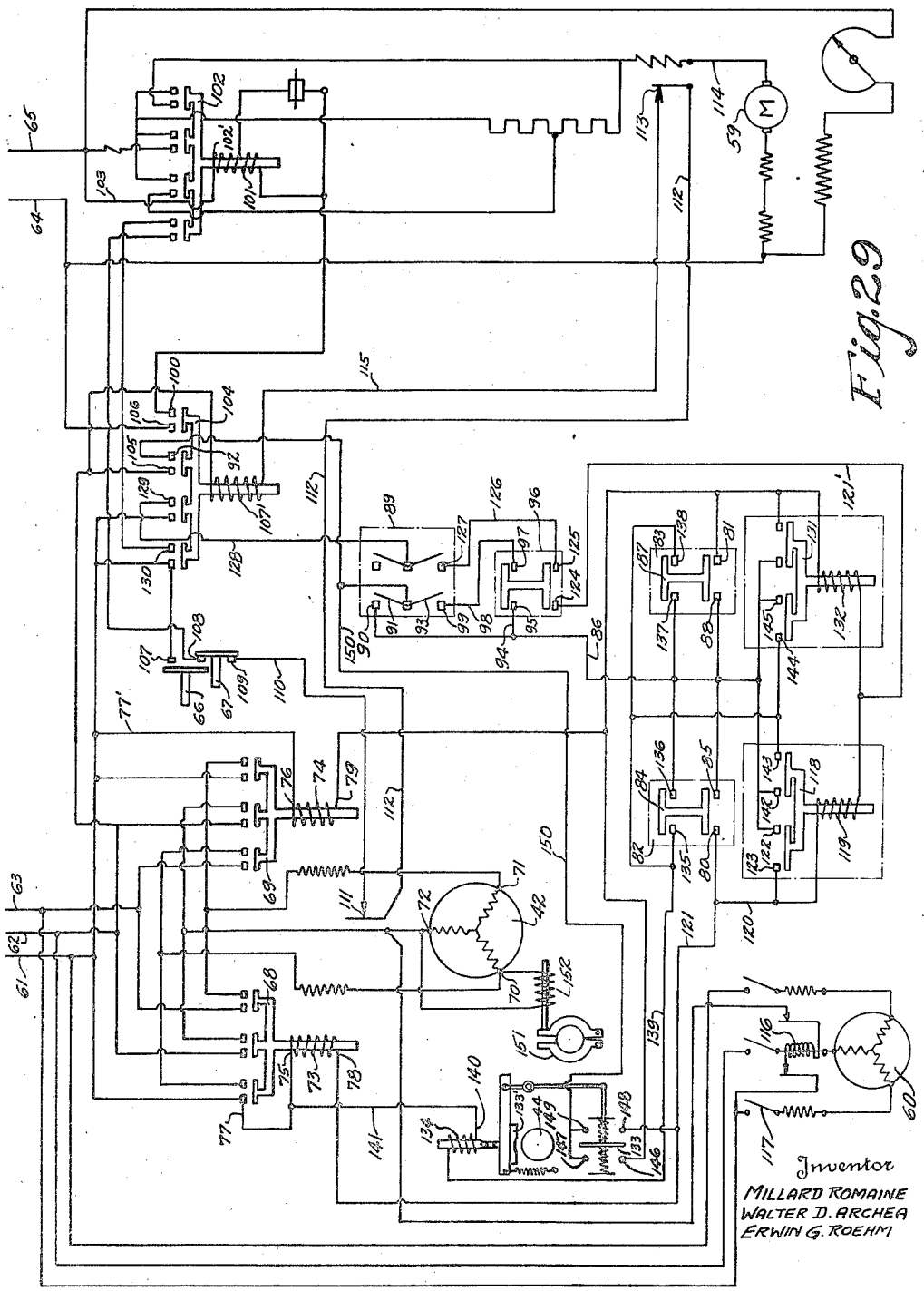

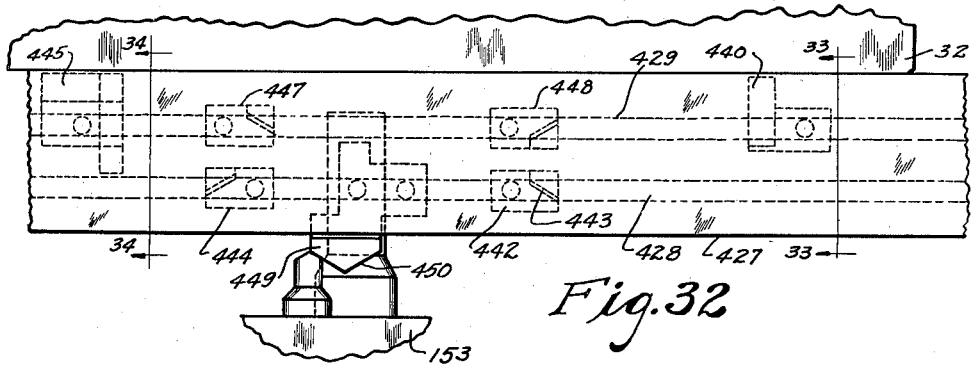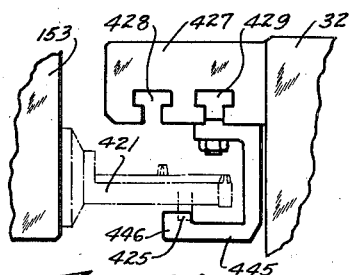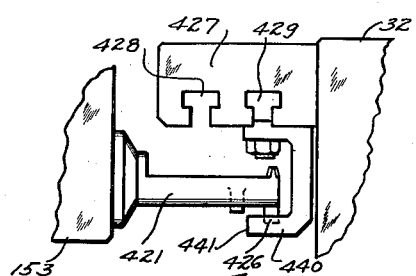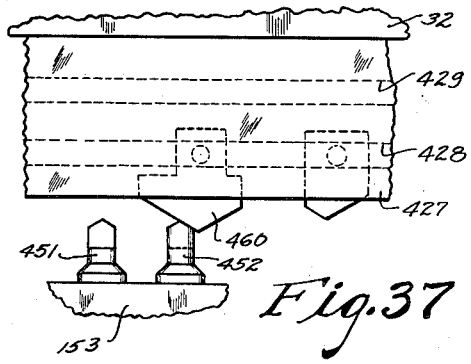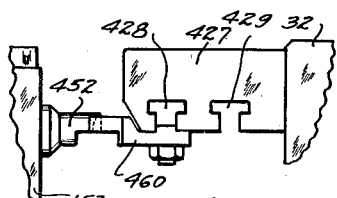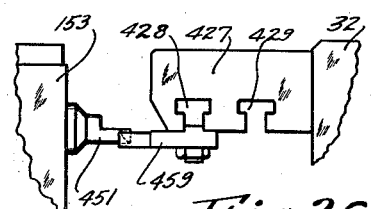

Patented Feb. 16, 1937

2,070,808

UNITED STATES PATENT OFFICE 2,070,808

MILLING MACHINE TRANSMISSION AND CONTROL MECHANISM

Millard Romaine and Walter D. Archea, Cincinnati, and Erwin G. Roehm, Norwood, Ohio, assignors to The Cincinnati Milling Machine Company, Cincinnati, Ohio, a corporation of Ohio Application January 3, 1934, Serial No. 705,108

40 Claims. (Cl. 90—21)

This invention relates to machine tools and more particularly to improvements in transmission and control mechanism therefor.

One of the objects of this invention is to provide individual motive power operation for every movable or shiftable control part of a machine tool transmission so that the action of the machine may be manually controlled in a convenient and comfortable manner; or automatically controlled with minimum working pressures on the tripping instrumentalities whereby longevity of usefulness and accuracy of operation thereof is enhanced.

Another object of this invention is to motorize all the control elements of a machine tool transmission with a flexible form of power suitable for remote control whereby the ultimate control devices do not have to be mounted in any definite relation to the respective elements controlled, and may all be centralized and nested to form a single ultimate control unit.

A further object of this invention is to provide an improved control circuit for a machine tool whereby separate prime movers actuable by different forms of current may be utilized with different units of the transmission without inconvenience, and containing proper interlocks so that the operation of one prime mover may be in predetermined relation to the other.

An additional object of this invention is to provide mechanism for interconnecting inherently different power control systems whereby each may have a controlling effect on the other.

A still further object of the invention is to improve the timing of various functional changes in a machine tool transmission so that, for instance, one rate may be shaded into another rate smoothly and efficiently; or sufficient time lapse provided to permit cleanup by the cutter between stoppage and return of the table.

Another object of this invention is to provide an ultimate single control unit for all the functions of a machine tool which may be interchangeably applied to different parts of the machine so that the normal operating station of the machine may be selectively determined without changing or altering the interior mechanism of the machine.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims, without departing from or exceeding the spirit of the invention.

Referring to the drawings in which like reference numerals indicate like or similar parts:

Figure 2 is a vertical section showing the final connection between the feed transmission and the table lead screw and the application of a back lash eliminating mechanism thereto.

Figure 3 is a horizontal section through the bed of the machine showing the arrangement of the main control elements for the machine.

Figure 4 is a plan view of the feed and rapid traverse transmission for effecting relative movement between the tool and work.

Figure 5 is an expanded view of the transmission for rotating the cutter spindle.

Figure 6 is a detail section as viewed on the line 6—6 of Figure 4.

Figure 7 is a detail section showing the feed brake as viewed on the line 7—7 of Figure 4.

Figure 8 is an expanded view showing the arrangement of the drive from the table operating motor.

Figures 9 to 14 inclusive are views showing the various positions of the single rate and direction control lever for the table, together with the trip operable plunger associated therewith.

Figure 1:
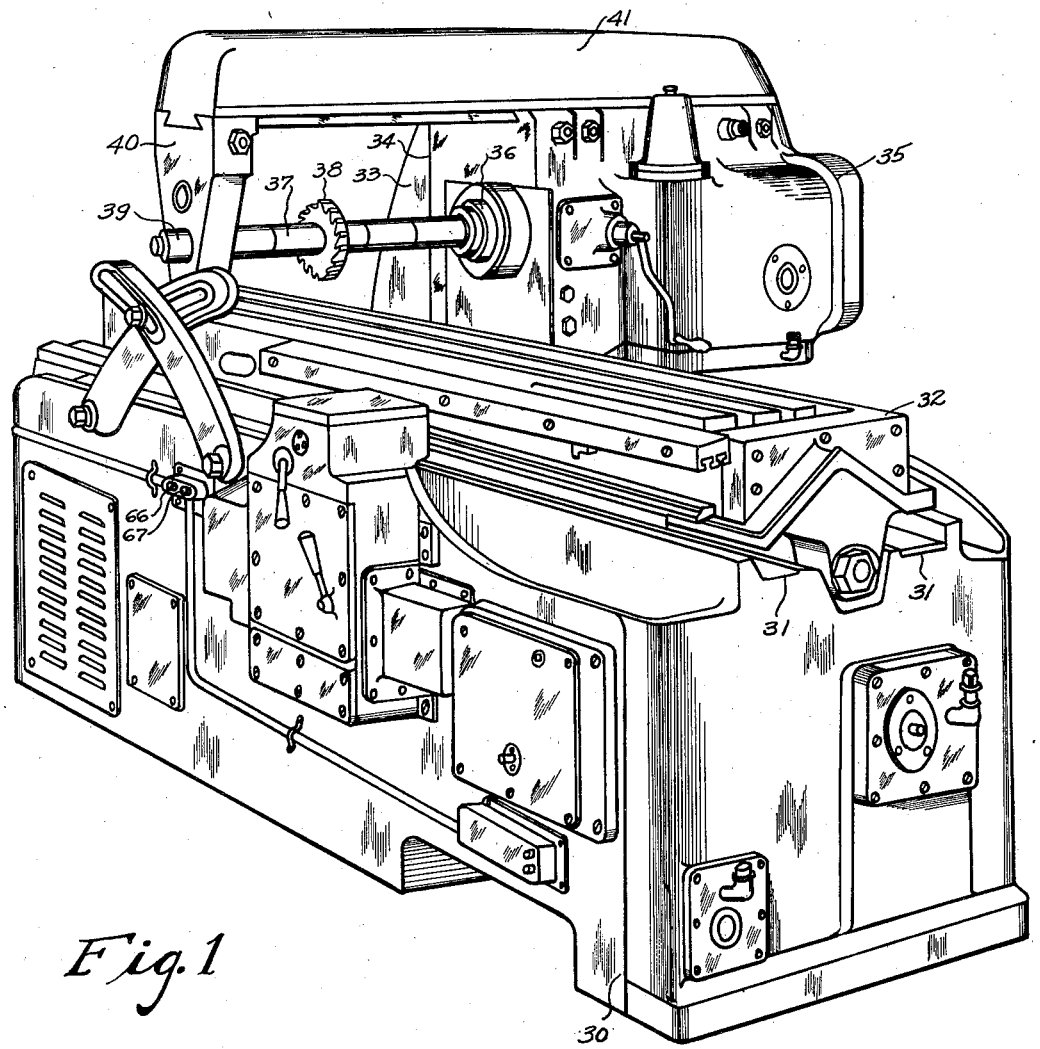
Figure 1 is a perspective view of a machine embodying the principles of this invention.
Figures 15, 17:
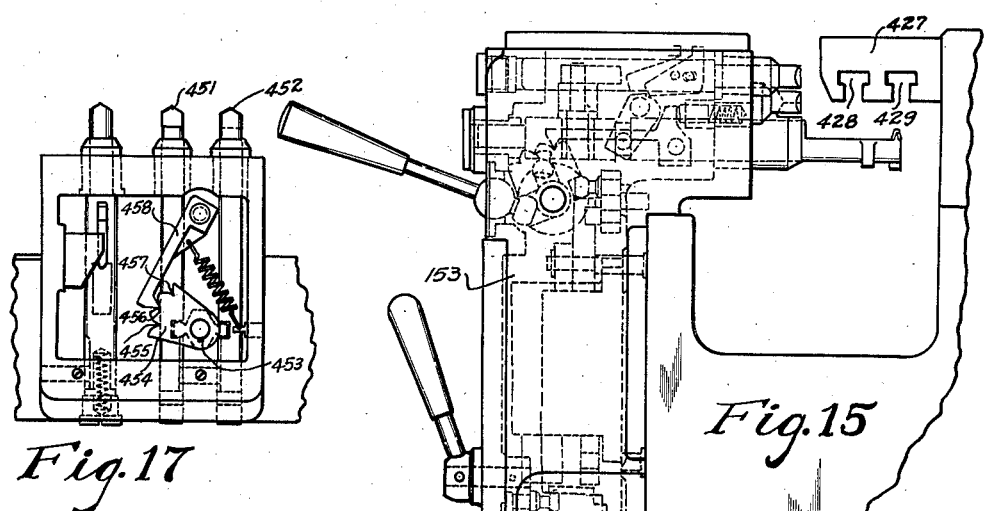

Figure 15 is an end elevational view of the control bracket as viewed from the right hand end of the machine as shown in Figure 1.

Figures 16, 18:
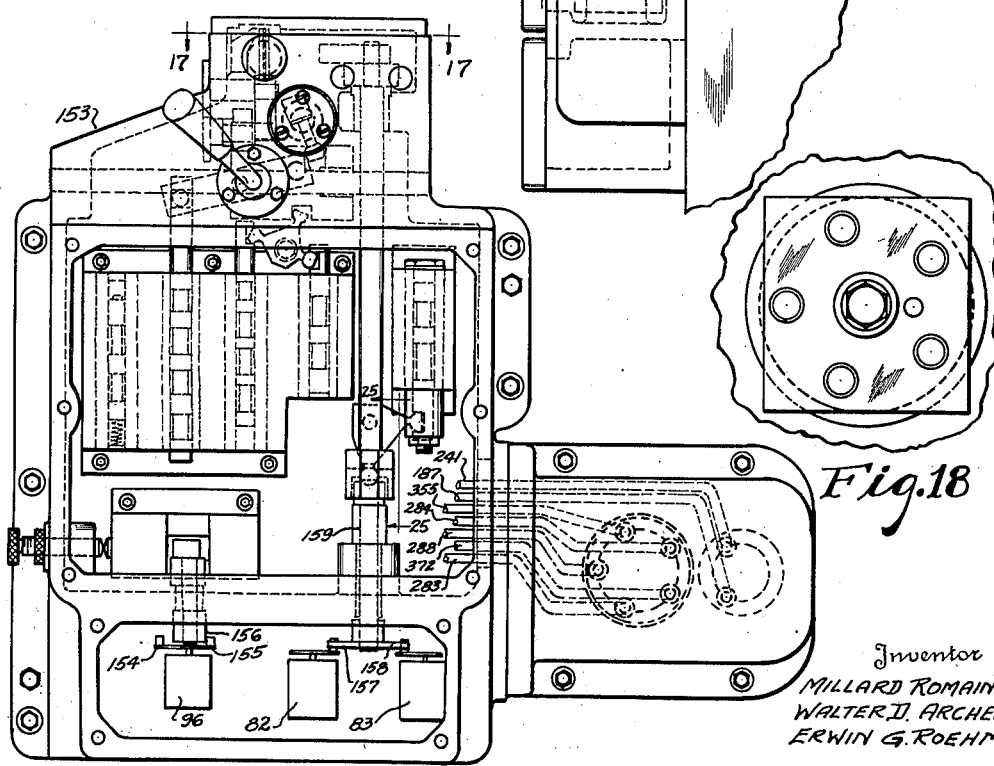

Figure 16 is a front view of the control bracket with certain plates removed to show the interior thereof.

Figure 17 is a section on the line 17—17 of Figure 16 showing the stop plunger and the cutter spindle directional control plunger.

Figure 18 is a detail section on the line 18—18 of Figure 4.

Figure 19:
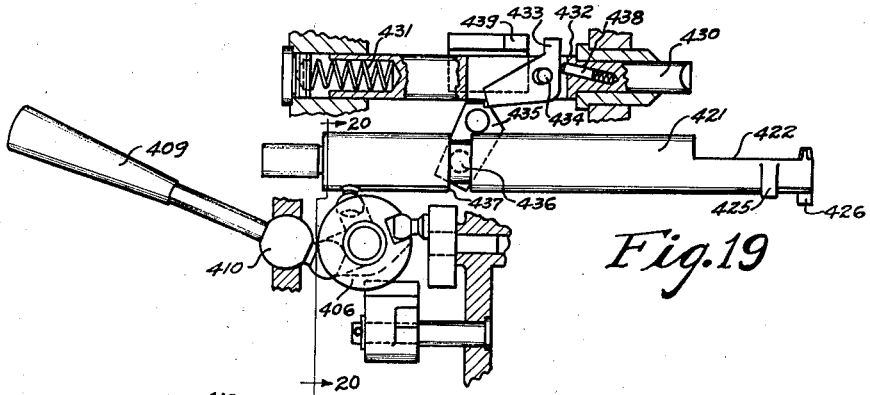

Figure 19 is a detail view showing the linkage interconnecting the manual table control lever, the trip plunger and the stop plunger.

Figure 20:
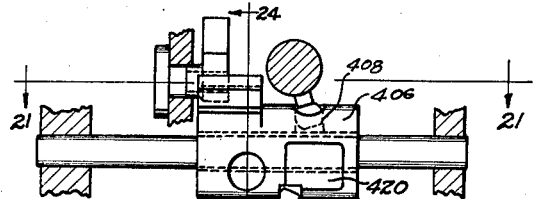

Figure 20 is a detail view on line 20—20 of Figure 19.

Figures 21, 23:
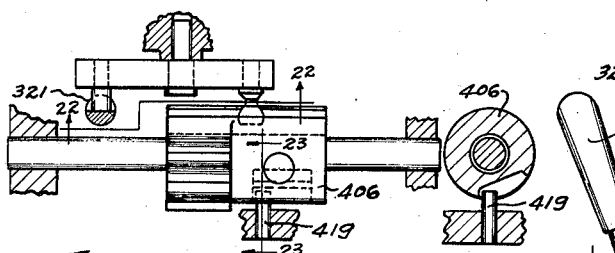

Figure 21 is a detail view on line 21—21 of Figure 20.

Figure 22:
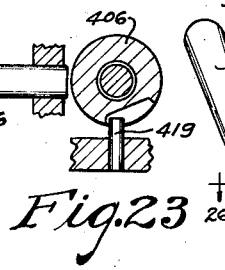

Figure 22 is a detail view on line 22—22 of Figure 21.

Figure 23 is a detail view on line 23—23 of Figure 21.

Figure 24:
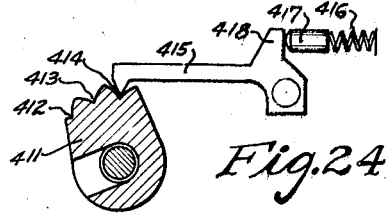

Figure 24 is a detail view on line 24—24 of Figure 20.

Figure 25:
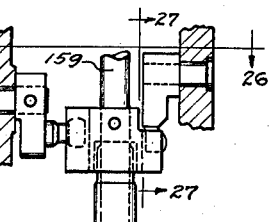

Figure 25 is a detail view of the spindle reverse control mechanism as viewed on the line 25—25 of Figure 16.

Figure 26:
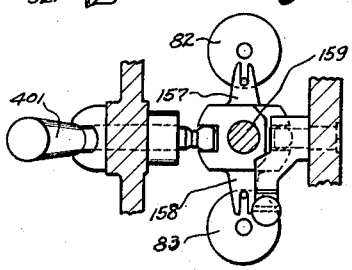

Figure 26 is a detail sectional view as taken on the line 26—26 of Figure 25.

Figure 27:
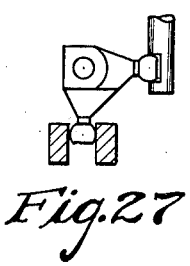

Figure 27 is a detail view on the line 27—27 of Figure 25.

Figure 28 is a diagrammatic view of the hydraulic control mechanism.

Figure 29 is a diagrammatic view of the electrical control mechanism for the spindle.

Figures 30 and 31 are views showing the other positions of the rate control valve plunger.

Figures 32 to 37 are views of various types of control dogs that may be used in controlling the operation of the machine.

A machine embodying the principles of this invention is shown in Figure 1 in which the reference numeral 30 indicates the bed of the machine, having guideways 31 formed on the upper face thereof for receiving and guiding a horizontally reciprocable work table 32. A column 33 rises from the rear of the bed and has guideways 34 formed thereon for receiving a vertically adjustable spindle carrier 35 in which is rotatably journaled the cutter spindle 36. This spindle in accordance with well known practice is adapted to receive a cutter arbor 37 for supporting a rotatable cutter 38. The outboard end 39 of the arbor may be suitably supported in a pendant 40 carried at the end of an over-hanging overarm 41. It will thus be seen that by attaching a work piece to the table 32 and moving the same relative to the rotating cutter 38 that a machining operation may be performed.

This machining operation may be effected in two different ways, that is, by rotating the cutter 38 in such a direction that its teeth, when contacting the work, travel in substantially the same direction as the work which is known in the art as a hook-in cut; or by rotating the cutter in such a direction that the teeth, when contacting the work, travel in a direction opposed to the direction of work movement. The latter is the more usual practice because of the difficulty heretofore in eliminating back lash from the table feeding mechanism when the former method is used. This machine, however, is provided with a suitable back lash eliminating mechanism forming the subject matter of a copending application, and since it is thus possible in this machine to eliminate back lash, it becomes possible to rotate the cutter in either direction regardless of the direction of feeding movement of the table, and the control mechanism is so organized that this may be accomplished. In addition, the control mechanism for the spindle is interlocked and inter-connected with the table feeding mechanism so that certain results are obtained automatically regardless of the direction of spindle rotation. In other words, all of the automatic cycles obtainable with the ordinary manner of cutter operation, that is, a non-hook-in cut, are also obtainable with the hook-in cut method of operation. The machine cycles may also be controlled manually, in which case the cutter spindle control mechanism is divorced entirely from the feed control mechanism so that each may be selectively operated at will, which means that either direction of cutter rotation may be utilized with a given direction of feed movement.

Spindle transmission

Referring to Figures 3 and 5, the prime mover 42 for the spindle is located in the base of the column portion 33 of the machine and connected by a suitable power transmitting band, such as a chain 43 to the main drive shaft 44. This shaft extends horizontally in the bed of the machine and is provided with a bevel gear 45 intermeshing with bevel gear 46 secured to the end of the vertical shaft 47 which extends upwardly in splined relation to the hub 48 of the bevel gear 49 carried by the spindle carrier 35. This splined connection permits the spindle carrier to be moved upwardly and downwardly with respect to the bed of the machine without breaking the driving connection to the spindle prime mover.

A large gear 50 intermeshes with gear 49 for driving shaft 51, which is interconnected by means of change gears 52 with a second shaft 53. The change gears 52 constitute a rate changer for the spindle. The shaft 53 carries a pinion 54 meshing with the large bull gear 55 which is journaled in the carrier in splined relation to the shank 56 of the cutter spindle so that the spindle may be adjusted longitudinally relative to the carrier. The forward end of the spindle is journaled in the quill 57 which is longitudinally adjustable in the usual manner through the shaft 58. It will be noted that no reversing gears have been provided in this transmission because the motor 42 is a reversible motor and to this end suitable electrical control mechanism, such as shown in Figure 29, has been provided for changing its direction of rotation. This electrical control mechanism is selectively interlocked with the table control mechanism so that the spindle may be stopped during quick traverse movements of the table; or may be operated independently of the table. This electrical control mechanism also includes means for controlling operation of the table feed motor 59 and the coolant pump motor 60.

Electrical control mechanism

The spindle motor 42 and the coolant pump motor 60 are alternating current motors and are supplied from a three-phase alternating current source represented by lines 61, 62 and 63. The feed motor, however, is a direct current motor and is supplied from a direct current source represented by lines 64 and 65. In spite of the diversity of current supply, all of these motors may be simultaneously started or stopped from a single pair of push buttons 66 and 67 located on the front of the machine, as shown in Figure 1.

The cutter spindle motor 42 is connected in parallel to a pair of three-pole switches 68 and 69. It will be noted, however, that when the switch 69 is closed the terminal 70 and the terminal 71 of the motor are connected respectively to lines 63 and 61, whereas when the switch 69 is closed these connections are reversed and the terminal 71 is connected to line 63 and the terminal 70 is connected to the line 61. The remaining terminal 72 of the motor is connected in each case to line 62. It will thus be seen that when the switch 69 is closed, the spindle motor will rotate in one direction, and when this switch is opened and the switch 68 closed, the motor will rotate in the opposite direction. The switches 68 and 69 are thrown by operating solenoids 73 and 74 respectively. The terminals 75 and 76 of these solenoids are permanently connected by lines 77 and 77' respectively to one of the A. C. supply lines, such as 61. The other terminals 78 and 79 are connected respectively to the switch points 80 and 81 of the directional control switches 82 and 83. When the switch contact 84 of switch 82 is closed, the current flows from contact 80 to contact 85 and through the common return line 86 back to the A. C. supply line 62. This will cause rotation of the spindle motor in a left-hand direction. Similarly, when the switch member 87 of switch 83 is closed, contact 81 is connected to contact 88 and the current flows through the common return line 86 to the A. C. line 62, thereby causing rotation of the spindle in a right hand direction.

Means have been provided for selectively controlling operation of these switches, either manually or automatically, and to this end the line 86 is connected through a first control switch 89 which selectively determines whether the spindle reversing switches are to be controlled manually or automatically. The line 86 is connected to the contact 90 so that when the double pole switch 91 is closed, the contact 90 will be directly connected to the switch terminal 92 of the main control switch. When the double pole switch 93 of switch 89 is closed, contact 90 is disconnected and the current from line 86 then flows through branch 94 to the switch point 95 of the automatic spindle stop pilot switch 96. When this switch is closed, contact 95 is connected through contact 97, line 98, contact 99, switch 93, to the terminal 92 of the main control switch.

The main control switch has a second contact 100 which is adapted to connect, when the switch is closed, the D. C. supply line 64 with the operating solenoid 101 of auxiliary switch 102, the other terminal 102' of this solenoid being connected directly by line 103 to the other D. C. supply line 65. The multiple pole switch 104 which connects the terminals 92 and 100 with the terminals 105 and 106 of the A. C. supply line 62 and the D. C. supply line 64 respectively, is operated by the solenoid 107 energizable by pressing the push button 66. In other words, pressing this button connects the terminal 107, which is directly connected, as shown, to the A. C. supply line 61, to contact 108, which at this time is connected to contact 109 because switch 67 is closed, and the current flows from contact 109, through line 110, the thermostatically controlled switch 111 which is associated with the supply line to terminal 71 of the spindle motor so as to open upon overload, line 112, thermostatically controlled switch 113 which is associated with the supply line 114 of the table feed motor 59 so as to open upon overload of that motor, line 115, solenoid 107' and back to the A. C. line 62. It will thus be seen that a single push button may be utilized to start both the alternating current motor 42 and the direct current motor 59. Attention is also invited to the fact that the closing of either reversing switch 68 or 69 will cause energization of solenoid 116, thereby closing the three-pole switch 117 and starting the coolant motor 60. Conversely, when the push button 67 is operated, the solenoid 107 is de-energized and the main switch 104 opened which thereby simultaneously stops all of the motors.

A self-latching switch mechanism has been provided in parallel with the direction control switches 82 and 83 so that after these switches have been closed and are under automatic control which means switch 93 is closed, that inadvertent manual opening of switches 82 and 83 will have no effect. To this end a first automatic switch 118 operable by a solenoid 119 is provided, one terminal of the solenoid being connected by line 120 to line 121 and the other terminal to the common return line 121'. When switch 82 is closed, current then flows by way of line 86, contacts 85, 80, lines 121, 120, solenoid 119, line 121', and contacts 124, 125. Energization of solenoid 119 closes switch 118 and interconnects contacts 122, 123. Current now flows from line 86 by way of contacts 122, 123, line 120, solenoid 119, line 121', and contacts 124, 125. It will now be apparent that opening contacts 80, 85 will have no effect because the current will be by-passed around them from 86, through contacts 122, 123, line 120, to line 121. Line 121' is connected to a contact 124 of the automatic spindle stop switch 96 so that when this switch is closed, contact 124 will be connected through contact 125 and line 126 to contact 127 of the selector switch 89, and when this switch is thrown for automatic operation, current will flow therefrom through line 128 to the terminal 129 of switch 104 operable by solenoid 107'. When switch 104 is closed, terminal 129 will be connected directly to the A. C. supply line 61.

A second switch 131 is provided for by-passing contacts 81 and 88 of the directional control switch 83 and is operated by a solenoid 132 having one terminal connected to contact 81 for receiving current from line 86, and the other terminal connected to the common return line 121'. It will be apparent that when the switch 91 is thrown for manual operation, that the automatic spindle control switch will be opened, but even if closed will not be supplied with current, and therefore the line 121' will be open preventing operation of the solenoids 119 and 132 so that the sole control of rotation of the spindle will then lie in the switches 82 and 83.

A known commercial form of plugging relay is also provided in this circuit and such a device consists of a switch member 133 which is adapted to be thrown by a friction member 133' riding in contact with one of the rotating shafts of the spindle transmission, but when current is on the line this friction member is normally retained out of contact with the shaft by a solenoid such as 134. As shown in Figure 5, this relay mechanism is mounted in a housing 44' adjacent the end of shaft 44. It is therefore necessary to deliver current to this solenoid at all times during power rotation of the spindle motor, and for this reason the two directional control switches 82 and 84 are provided with additional sets of contacts for accomplishing this, the switch 82 having a pair of contacts 135 and 136, and the switch 83 having a pair of contacts 137 and 138, the closing of either of which delivers current to line 139 connected to the solenoid. The other terminal 140 of the solenoid is permanently connected by line 141 to the AC supply line 61. Similarly, the switch 118 has a pair of contacts 142 and 143 and the switch 131 a pair of contacts 144 and 145, the closing of either pair of which will by-pass the switches 82 and 83 in a similar manner to that previously described. It should now be apparent that when the automatic spindle stop switch is opened, as during automatic operation, or when either of the switches 82 or 83 are opened as during manual operation, the current will be disconnected from the reversing switch operating solenoid 73 and 74 and all current will be cut off from the spindle motor. But due to the tendency of these motors to coast after the current is disconnected therefrom, means have been provided in the form of this plugging relay to instantly stop the motor.

When the current is disconnected from the motor 42, the solenoid 134 becomes deenergized, thus permitting the friction member to drop as by gravity into engagement with the shaft 44, and thus move the switch member 133 either to the left to close contacts 146 and 147, or to the right to close contacts 148 and 149 depending upon the direction of rotation of the spindle, and thus connect a branch line 150, which is directly connected through switch 92 to the A. C. supply line 62, to either the solenoid 73 or the solenoid 74. The movement of switch 133 is so arranged, that the pair of contacts which will be closed, will be those which will cause rotation of the motor in an opposite direction thereby acting as a dynamic brake. This acts to quickly stop the motor and cause reverse rotation, but the moment reverse rotation sets in, the switch 133 will be moved out of engagement with the contacts and thereby cause substantially an instantaneous stop of the motor. To further facilitate control of the motor, a friction brake 151 is provided which is normally held in a closed position by a spring, but is released by a solenoid 152 connected across contacts 70 and 72 of the motor, and energized whenever the motor is running.

The automatic spindle stop switch 96 is mounted in the bottom of the control bracket 153, as shown in Figure 16, and this switch has a pair of operating arms 154 and 155 adapted to be thrown by the hydraulically operated lever 156. The switches 82 and 83 are also mounted in the lower portion of the control bracket 153, as shown in Figure 16, and these are inter-connected through operating arms 157 and 158, Figure 26, to a common control shaft 159 so that when this shaft and the connected arms are in the position shown in Figure 26, both switches will be open. Rotation counter-clockwise a predetermined amount, will close switch 82, while rotation clockwise through the same amount from the central position shown will close the switch 83. The shaft 159 is connected through suitable mechanism, to be described later, for manual operation; or automatic operation by the table.

*Table transmission*

The table transmission shown in Figure 4 is driven from the prime mover 59 which is connected through the mechanism shown in Figures 3 and 8 to the motor drive shaft 160. As shown in detail in Figure 8, the armature shaft 161 of motor 59 is connected by a chain 162 to an intermediate shaft 163 which has keyed thereto a sprocket 164 connected by chain 165 to the sprocket wheel 166 keyed to the end of shaft 160. This shaft extends through the gearing box 167 for driving the variable feed transmission and also carries a gear 168 meshing with gear 169 for driving the pump 170 which supplies fluid pressure, as shown in Figure 28, for operating the hydraulic control mechanism.

The shaft 160 serves to actuate the feed transmission and the rapid traverse transmission, which are arranged in parallel, for rotating the final drive shaft 171; and an overrunning clutch 172 is arranged between the terminal of the feed transmission and the final member 173 of the rapid traverse transmission to permit the latter to overdrive the feed transmission without disengagement of the feed clutch. A rapid traverse drive gear 174 is mounted for free rotation on the shaft 160 so as to idle thereon when the feed transmission is active, but connectible to the shaft through the multiple disk friction clutch 175 when quick traverse movement is desired. An annular grooved ring member 176 is adapted to be moved to the right, as viewed in Figure 4, by the shifter fork 177 having a pair of diametrically opposed pins 178 engaging the annular groove 179 formed in the ring 176. The shifter fork is pivoted at 180, as shown in Figure 28, and is moved to a clutch engaging position by a piston 181 slidably mounted in a cylinder 182. A spring 183 acting on the opposite side of the fork from the piston, serves to release the clutch when the pressure on the piston is released. The rapid traverse clutch is thus a fluid operated clutch so far as engagement is concerned and is spring operated so far as disengagement is concerned. The gear 173, which meshes with the rapid traverse drive gear 174, is keyed to an auxiliary shaft 184, journaled at opposite ends in anti-friction bearings 185 and 186, and has an enlargement at one end beyond the bearing 186, more particularly shown in Figure 6, containing a fluid operated friction brake. Fluid pressure is supplied to this brake through pipe 187 connected to a non-rotating sleeve 188 which surrounds an annular groove 189 formed on the periphery of shaft 184. The shaft has an axial bore 190, connected by radial holes 191 with the annular groove, and serves to conduct pressure to the chamber 192 formed adjacent the ends of plungers 193, 194 and 195. As these plungers move radially outward upon admission of pressure, plunger 193 engages the lower end of a brake lever 196, which is pivoted at 197, adjacent one end of an expansible ring 198, the other end of the lever having a cam portion 199 engaging the other end 200 of the brake ring to expand it. The brake ring is mounted interiorly of the surrounding housing 201 which housing is integral with the final shaft 202 of the feed transmission, this shaft terminating adjacent the end of shaft 184 and is therefore independent thereof. As the ring is expanded by plunger 193, plungers 194 and 195 also move outward to provide additional frictional pressure between the ring and housing and also aid in controlling the ring.

The shaft 160 extends on through the gear 174 to drive the feed transmission and for this purpose has the inner member 203 of a multiple disk friction clutch 204 keyed thereto, the outer member 205 of the clutch being journaled exteriorly in the thrust bearing 206 and interiorly on the reduced end 207 of shaft 160. Engagement of this clutch is effected in the same manner as the rapid traverse clutch and to this end a second annular grooved member 208 is provided which is laterally movable by a shifter fork 209 having diametrically opposed pins 210 engaging the annular groove 211 for shifting member 208. The shifter fork 209 is pivoted at one end on the pin 212, Figure 28, and is engaged at the free end by the fluid operated piston 213 sliding in the cylinder 214. When pressure in the cylinder is released, a spring 215 comes into action to release the clutch.

A drive pinion 216 is fixed to the end of the member 205 in mesh with the large gear 217 mounted for free rotation on the shaft 202. This gear actuates a reduction train consisting of gears 218, 219, 220, 221, 222 and 223, the power being transmitted through the same in the order named. The gears 219 and 220 are mounted for free rotation on auxiliary shaft 224, this shaft being journaled in a sleeve 225 which in turn carries gear 223. The end 226 of the sleeve is splined in order to selectively receive a gear thereon; or to receive a collar 227 when the sleeve is not used as a part of the feed transmission. Attention is invited to the fact that the shaft 224 extends beyond the sleeve and has a splined portion 228 for receiving the spur gear 229, as shown in Figure 4, and this splined end is the same size as the splined end of the sleeve 225 so that the collar 227 and the gear 229 may be interchanged. When the gear 229 is mounted on the end of shaft 228, then the reduction train includes gears 216, 217, 218 and 219 only, the gear 219 driving shaft 224 directly. When the gear 229 is mounted on the end of sleeve 225, an additional reduction in the train is effected, the drive then continuing from gear 229 through gear 220, 221, 222 to gear 223.

The shaft 202 which supports gears 217, 218, 221 and 222 for free rotation extends through the anti-friction bearing 230 where it is provided with a splined end 231 for receiving a collar 232 and a change gear 233. The collar and the gear may be interchanged in accordance with the driving conditions at the end of shaft 224 so that the gear 233 will mesh with gear 229. The gears 233 and and 229 constitute a rate changer since other pairs of gears may be substituted therefor to vary the feed rate. These removable gears, selectively attachable to shafts 224 and 202, are held in place by a cover plate 234 adapted to be secured as by bolts 235 to the end of the housing 167. As previously mentioned, the shaft 202 drives through the overrunning clutch 172 to actuate the final drive shaft 171.

The feed transmission is also provided with a fluid operated brake which consists of a brake-shoe 236 which, as more particularly shown in Figure 7, is pivoted at one end on the pin 237 and normally held in a released position by a spring 238 connected to the opposite end of the lever. Engagement of the feed brake is effected by a fluid operated piston 239 reciprocably mounted in a cylinder 240 which is adapted to be supplied with pressure through a pipe 241.

It will now be seen that there is provided a feed transmission and a rapid traverse transmission, each having a fluid operated clutch for rendering the same active, and that the feed transmission is connected through an overrunning clutch to the final member so that the rapid traverse transmission may be engaged even although the feed clutch is also engaged. Each transmission is also provided with its own fluid operated brake and one of the advantages of this is that the rapid traverse brake serves to slow down the final drive member 184 to the speed of the feed transmission, as when shifting from quick traverse to feed without waiting for the natural deceleration to take place, thereby insuring a smooth action when changing from a rapid rate to a feeding rate. It will also be noted that all of these control parts are operated by a power medium which lends itself to remote control.

The shaft 184 has a bevel gear 242 keyed to the end thereof and meshing with a pair of bevel gears 243 and 244 mounted for free rotation on the shaft 171. Bevel gears 243 and 244 have clutch teeth 245 and 246 on the opposing faces thereof, adapted by clutch teeth 247 formed on opposite ends of the shifter member 248. This shifter member has an annular groove 249 engaged by the fluid operated shifter member 250. As more clearly shown in Figure 28, the member 250 is pinned to a piston 251 which is slidably mounted at opposite ends in cylinders 253 and 254.

When pressure is admitted to one cylinder alone, the piston rod 251 will move in the direction of the cylinder having no pressure therein, thereby engaging the clutch on that side. This makes it possible to move the table clutch into either one of two positions to cause movement of the table selectively either to the right or to the left.

The shaft 171 extends to the nut box 255 as more particularly shown in Figure 2. The shaft has a pinion 256 secured to the end thereof meshing with a pinion 257 integral with sleeve 258, the sleeve having a pair of spiral gears 259 and 260 fixed thereto, meshing with spiral gears 261 and 262 which are interiorly threaded for receiving the table lead screw 263. The sleeve 258 is connected by a piston rod 264 to a piston 265 slidably mounted in cylinder 266. The gears 259, 260, 261 and 262 are oppositely spiraled in the manner more particularly shown in co-pending application 694,423 filed October 20, 1933, and constitute a back-lash mechanism which may be rendered active by admission of pressure through pipe 267 or inactive by admission of pressure through channel 268. Since the construction and operation of this back-lash eliminator is more particularly described in the co-pending application, further description thereof is not deemed necessary here.

The table is adapted to be manually traversed through a bevel gear 269 keyed to the shaft 171 and meshing with bevel gear 270 fixed to the end of shaft 271 adapted to be rotated through the manually operable lever 272 which is selectively removable from the end of shaft 271 during power operation of the machine.

*Control mechanism*

All of the various clutches, brakes, back-lash eliminator and control switches for the spindle transmission, are all adapted to be fluid operated which makes possible remote control either manual or automatic and in the latter case a number of interlock features are provided to insure proper sequence of operation of the various elements. All of the various fluid operable devices are supplied with pressure from a common supply pump 170 which is driven in the manner as previously explained, and is provided with a reservoir 273 from which fluid is withdrawn through intake 274 and delivered under pressure to channel 275. A relief valve 276 is associated with this channel for maintaining a constant pressure therein, the excess fluid being discharged through channel 277 to a lubricating header 278 from which a plurality of pipes extend to the various bearings, etc., in the machine.

The pipe 275 is connected to a first branch 279, Figure 28, which is normally connected to channel 280 leading to the feed clutch cylinder 214 by the valve 281 normally held in such position by a spring 282.

A second branch 2833 extends from the main supply line 275 to the pressure port of the directional control valve 284.

*Directional control valve*

The valve 284 has a pressure port 285 constantly supplied with pressure from channel 283; a pair of delivery ports 286 and 287 which are respectively connected by lines 288 and 289 to cylinders 254 and 253 for shifting the table reversing clutch 248; and a pair of ports 290 and 291 which are connected to a common return line 292. A valve plunger 293, slidably mounted in the valve has an enlarged central spool 294 which diverts the pressure fluid from port 285 to either port 286 or 287. The spool is connected by reduced portions 295 to end portions 296 and 297, these end portions being of larger diameter than the connecting portions 295 but smaller in diameter than the spool 294. This means that when fluid is admitted to one side or the other of spool 294, there is a pressure differential created between that acting on the end face of spool 294 and that acting on the end face of the respective end portion so that an axial resultant is created to automatically shift the plunger after it has passed the half-way point. In other words, if the valve is moved by external means, one-half of its distance, which at that time will exactly close port 285, and then a slight additional amount, the admittance of pressure to the opposite side of spool 294 will complete the shifting of the valve in the same manner as a detent mechanism. This valve may thus be termed a self-energized valve, in the sense that after it has been moved slightly more than one-half of its travel, it will automatically complete its movement. It will be apparent that when pressure is admitted as to port 286, that port 287 will be connected to the reservoir port 291; and vice versa, when pressure is admitted to port 287, port 286 will be connected to the reservoir port 290.

Channels 288 and 289 have branches 298 and 299 which extend to opposite ends respectively of the back-lash directional control valve 300. This valve has a port 301 through which pressure is received; ports 302 and 303 to which lines 267 and 268 are respectively connected; and a pair of exhaust ports 304 and 305. The back lash eliminator is of such a type that upon rotation of the drive shaft 171 in a given direction, the admittance of pressure to port 267 will cause the back lash eliminating mechanism to be effective, but upon reversal of shaft 171 the admittance of pressure to this same port will cause the back lash eliminating mechanism to be ineffective. It is therefore necessary to reverse the pressure connections to channels 267 and 268 upon change in the direction of movement of the table and the channels 298 and 299 are thus connected to effect this reversal by proper action on the reversing valve plunger 306. Thus the reversal of back-lash eliminating pressure is automatically taken care of with the change in direction of table movement.

The lines 288 and 289 have a second pair of branches 307 and 308 which are connected respectively to ports 309 and 310 formed at opposite ends in the reversing clutch, interlock control valve 311. This valve has a plunger 312 which is shiftable from one extreme position to the other to connect port 313 alternatively to port 314 or port 315. Port 313 is connected by channel 316 to the rapid traverse clutch cylinder 182 and form the supply line therefor. Ports 314 and 315 are alternatively connected by a valve plunger 317, operatively connected to the reversing clutch, to port 318. The function of this interlock valve mechanism is to insure that when a change is made from feed in one direction to rapid traverse in the other direction, that the direction clutch 248 is shifted while the feed transmission is still effective and the rapid traverse transmission ineffective so as to avoid shock between the clutch teeth 245 of gears 243 and 244. In other words, as soon as the reverse valve plunger 317 is shifted to change direction, the port 318 is disconnected from pressure by means to be subsequently described, and after the directional control valve plunger 293 has passed the half-way point, pressure is admitted to one of cylinders 253 or 254, and simultaneously to either port 309 or 310. Since the valve spool 312 is easily shifted, it will complete its movement before the clutch 248 has completed its movement. This insures that should pressure now come on to port 318, the valve spool 312 will be in a position to disconnect that pressure and it will not be reconnected until clutch 248 has completed its shift and, through the interconnecting lever 319, moved the valve plunger 317 to its other extreme position. This is another one of the refinements in the operation of this machine which adds to its smoothness of operation.

*Rate control and directional interlock valves*

The selection between quick traverse, feed, and stop is effected by the rate valve 320 having a plunger 321 movable therein to three positions corresponding to the above rates. The plunger 321 is shown in its lowermost position in Figure 28, which is the rapid traverse position. The valve housing has a lower port 322 which is connected by the forked line 323 to ports 324 and 325 of the directional interlock valve 326. This latter valve has a pressure port 327 which is connected by the branch 328 to the main pump supply line 283. The directional interlock valve has a plunger 329 which is connected by the ball crank 330 to the directional valve plunger 293 for simultaneous movement therewith. The plunger 329 therefore has only two positions being moved to its uppermost position when plunger 293 is moved downward, and it will be noted that, since the pivot point 331 of crank 330 is midway between these plungers, one plunger tends to counterbalance the weight of the other.

The plunger 329 has a lower cannelure 332 which, in the position of the valve shown in Figure 28, connects the pressure port 327 to port 324 and thereby to port 322 of the rate valve. The rate valve has a cannelure 333 which, when the valve is in the rapid traverse position, connects port 322 to port 334 and thereby through line 335 to the port 318 of the reversing clutch interlock control valve. This port is connected to the rapid traverse clutch in the manner previously described. If now with the valves in the position shown in Figure 28, with the rapid traverse clutch engaged, it is desired to change the direction of the quick traverse movement, the directional control valve plunger 293 will be moved upward simultaneously causing downward movement of plunger 329. As soon as the plunger 329 starts downward, it will be noted that the spool 336 thereon will immediately start to close the pressure port 327. As soon as this port has been closed, the port 325 will be connected by the cannelure 337 to the exhaust port 338. This will immediately relieve the pressure on the rapid traverse clutch causing sufficient disengagement thereof to take the load off of the table reversing clutch. It will also be noted that all of this has taken place prior to the spool 294 of plunger 293 reaching its midway position. After the spool passes its midway position, the valve plunger 312 will shift in the manner previously described to insure disconnection of pressure to the rapid traverse clutch until the reversing clutch has completed its movement. The valve plunger 329 will of course continue its downward movement after the spool 294 has passed its midway position, and this continued movement will cause the spool 339 to close the exhaust port 338, and the cannelure 331 to connect port 325 with the pressure port 327, so that the pressure fluid to the rapid traverse clutch now passes through port 327 to port 325, rather than through port 324 as it would when the table is traveling in the other direction.

The supply line 335 to port 318 has a branch 340 connected to port 341 of a spindle interlock control valve 342. This valve has a plunger 343 normally held in the position shown in Figure 28 by a spring 344. In this position the valve plunger has a cannelure 345 for connecting port 341 to the supply port 346 for operating the spindle stop mechanism.

This mechanism comprises a plunger 347 which is connected through the crank 156 for throwing the spindle control switches. This plunger is slidable in a bore 348 in housing 349, one end of the bore having a port 350 connected by line 351 to port 346. When pressure is applied to line 351, the plunger 346 is moved to the left thereby throwing switch lever 155 to a spindle stop position. Attention is invited to the fact that means have been introduced at this point to delay the operation of the spindle stop mechanism a sufficient amount beyond the actual stop of the table to permit the cutter to make a few additional revolutions in order to clean up the work before the work recedes from the cutter. This delay is accomplished in the following manner:

An adjustable needle valve 352 is mounted in the housing 349 and has a tapered portion 353 movable relative to port 354 which is connected through channel 355 to the left hand end of the bore 348. A second port 356 is provided in the housing and connected through the hydraulic resistance coil 357 to port 358 of valve 342, this port being connected by the cannelure 359 in plunger 343 to exhaust port 360 when the plunger is in the position shown. It will now be seen that when the plunger 347 starts to move toward the left, the outward flow of fluid from the left end of bore 348 through channel 355 and port 354 will be restricted by the needle valve 352. The amount of this restriction may be adjusted by a stop screw 361. A spring 362 normally holds the plunger 352 against the stop screw, but in order to insure that the pressure of the escaping fluid through port 354 does not overcome the spring, the fluid pressure in the right hand end of bore 348 is connected by channel 363, to act on the end of plunger 352 in addition to the pressure of the spring.

The rate valve 320 has another port 364 therein, which is connected, when plunger 321 is in the rapid traverse position, by cannelure 365 to port 366. This port is connected by the forked line 367 to ports 368 and 369 of the interlock control valve. When the valve plunger 329 is in the position shown in Figure 28 port 368 is connected by the cannelure 369' to the port 370 which is a permanent exhaust port being connected to the common return line 292. From this it will be seen that the port 364 is an exhaust port when plunger 321 is in its rapid traverse position. Therefore, the line 187 from the rapid traverse brake; the branch 371 on the spindle interlock control valve; and the branch 372 from the back lash control valve are all connected to reservoir so that during rapid traverse movement of the table the rapid traverse brake is released, the back lash eliminator is off and the cutter spindle is stopped.

The rate valve 320 has another port 373 to which is connected the channel 241 leading to the feed brake operating cylinder, and the branch 374 which is connected to the upper end of the valve housing 342. When the valve plunger 321 is in its rapid traverse position, port 373 is connected to port 375 by a cannelure 376 formed in plunger 321. A channel 377 connects port 375 to a port 378 formed in an interlock valve 379. This valve has a plunger 380 in which is formed a cannelure 381 for connecting port 378 to port 382 which in turn is connected to a reservoir line 383. It will thus be seen that the upper end of valve 342 is connected to reservoir so that the spring 344 may move the plunger 343 to its extreme upward position and thereby effect the connection shown in Figure 28; and that the feed brake is inoperative because the cylinder 240 is also connected to reservoir. Since the line 241 is also connected to a port 384 formed in the left hand end of the feed clutch control valve, the spring 282 of this valve is able to maintain the plunger 281 in the position shown, to connect the pressure line 279 to the feed clutch cylinder 214 and thereby maintain the feed clutch engaged. Although the feed clutch is engaged, it will be remembered that the rapid traverse clutch drives through an overrunning clutch so that no conflict exists.

The valve plunger 321 may be moved upward to an intermediate or feed position, as shown in Figure 30, in which case the port 334 is disconnected from pressure port 322 and connected to exhaust port 385. If no other changes are made in the valves, or in other words if the rate of the table is merely changed from quick traverse to feed, it will be seen that the shifting of this valve to the position shown in Figure 30 will release the pressure on the rapid traverse clutch, causing disengagement thereof; and will release the pressure acting on the end of the needle valve 352 and the piston 347, leaving the same free to be shifted toward the right in a manner to be immediately explained; and will also relieve the pressure on whichever end of the back-lash eliminating cylinder 266 is connected to port 301.

This movement of valve 321 to its feed position will also disconnect port 364 from the exhaust port 366 and connect the same to a pressure port 386 which port is directly connected to the pump supply line 283. This will cause fluid to flow into line 187 to cause application of the rapid traverse brake; into branch 371 which is still connected through cannelure 359, port 358 to port 356 of the spindle stop control valve to cause shifting of the needle valve 352 against the opposition of spring 362 so as to provide a free unrestricted flow to the left hand end of bore 348 and immediate shifting of plunger 347 which in turn will throw switch 154 to start rotation of the spindle; and to line 372 to effect operation of the back lash eliminator. The pressure in the back lash eliminator is controlled by a throttle valve 387 which has a first port 388 to which the supply line 372 is connected, and a second port 389 which is connected to port 301 of the back lash reversing valve 300. A plunger 390, reciprocably mounted in the valve 387, has a tapered portion 391 for controlling the pressure drop at the port 388. An axial bore 392 formed in the upper end of the plunger communicates through radial ports 393 with the annular groove 394 formed intermediate the ends of the valve plunger, and since this groove is filled with fluid under pressure, the fluid will flow to the upper chamber 395 and cause movement of the plunger in a direction tending to close port 388. This movement, however, is opposed by a spring 396 which may be adjusted, as by the set screw 397, so that the pressure drop at port 388 will remain a constant. The fluid thus delivered through the pressure control valve to port 301 is directed by the valve spool 306 to the proper end of the back lash eliminating cylinder 266 in accordance with the direction of movement of the table, the position of valve 306 being automatically determined in the manner previously explained. It will thus be seen that movement of the valve 321 to its feed position will cause operation of the rapid traverse brake, starting of the spindle and application of the back lash eliminating means.

Attention is invited to the fact that port 373 is still connected to port 375 when the valve is in its feed position, whereby the feed brake is still released and the feed clutch engaged.

This is because the line 377 is connected to the return line 383 through port 378, cannelure 381 and port 382 of interlock valve 379. The purpose of this interlock valve will now be explained. It will be recalled that the electric switch 96 shown in Figure 29, and operable by lever 156, as shown in Figure 28, can be rendered ineffective by the selector switch 89. In other words, when the switch 89 is set for manual control, the throwing of lever 156 by hydraulic pressure when valve 321 is moved to a feed position does not start the spindle. Since the machine is at this time under manual control, it is necessary for the operator besides manually shifting valve 321 to feed position to also manually start the spindle rotating by throwing lever 401, Figures 25, 26 and 28, to one side or the other of a central position, such as to the position shown in Figure 28. However, should the operator fail to do this, the feeding movement will not start, because the valve spool 402 will be in a central position indicated by the dotted lines in Figure 28, thereby closing both exhaust ports 402 and 403, and interconnecting ports 404 and 405. Since port 405 is a pressure port, being directly connected to pump line 283, fluid pressure will flow into line 377 and thereby through ports 375, cannelure 376 and port 373 of valve 320, to line 241 and branch 384, and shift valve plunger 281 to a position, releasing the pressure in line 280 and feed clutch cylinder 214 thereby preventing movement of the table. It will thus be seen that the interlock valve functions when the switch 89 is set for manual control to prevent feeding movement of the table until the cutter spindle is rotating.

Upward movement of the valve plunger 321 to its third or stop position as shown in Figure 31, will cause port 373 to be disconnected from port 375 and connected to pressure port 398 but this movement will still maintain port 364 connected to port 386, and port 334 connected with port 385. This new position of the valve will cause pressure fluid to flow through line 241 to cause operation of the feed brake and shifting of the feed clutch control plunger 281 against the resistance of spring 282, and cause line 280 to be disconnected from the pressure line 279, and connected to return line 383, thereby releasing the feed clutch. Pressure fluid flowing in line 241 will also pass through the branch 374 to cause shifting of plunger 343 against the resistance of spring 344 thereby disconnecting port 341 from port 346, but since the upper end of the valve 342 is under pressure, port 346 will be connected to line 374 through the by-pass 399 which will cause operation of the spindle stop switch 155. Downward movement of the plunger 343 will also disconnect the port 358 from the port 360 and connect it to the exhaust port 400. This will stop the spindle and the work support automatically.

In the operation of the machine it may be desirable to change from quick traverse in one direction to quick traverse in the other direction. If the reversing clutch was thrown to effect this change, there would be considerable clashing and shock on the clutch teeth in attempting to change a high speed movement of the heavy table in one direction to a high speed movement in the opposite direction. This is avoided in the following manner.

It will be noted from Figure 28 that the rate valve plunger 321 when in the rapid traverse position shown, connects the line 187 of the rapid traverse brake with the drain line 292 through inter-connection of ports 366, 368 and 370. It also connects pressure to the rapid traverse clutch through line 335. If now the plunger 329 is moved down as the reverse valve plunger 293 is moved up to change the direction of table movement, the following sequence of events occurs.

As plunger 329 of the interlock valve begins its movement, it opens port 369 to receive pressure from line 283; disconnects the drain port 370 from port 368; opens port 325 to the drain port 338; and closes the pressure port 327 from port 324. As the downward movement of the plunger continues, these various port connections will be completed to such an extent that the line 323, for instance, will be changed from a pressure line to a drain line thereby releasing the rapid traverse clutch. At the same time, line 367 will be changed from an exhaust line to a pressure line, thereby effecting application of the rapid traverse brake. All of these connections will be completed and the above named results effected before the spool 294 of the direction valve reaches its middle position. The result is that the high speed movement of the final drive shaft 171 will be decelerated to such a point that when the spool 294 passes the half-way point the reverse clutch 248 may be shifted without clashing or shock of the clutch teeth. The actual reverse connections are thus obtained in a smooth and quiet manner. After the spool 294 passes the half-way point the plunger 329 of the directional interlock valve continues its movement to re-establish the original connections so that line 323 will again become a pressure line, but this time through inter-connection of ports 325 and 327; and the line 367 will become a drain line, but this time between inter-connection of port 369 with port 370. This will again cause application of the rapid traverse clutch and release of the rapid traverse brake to permit acceleration of the parts to the rapid rate but in the opposite direction.

*Manual and automatic control mechanism*

The rate and direction control valves are coupled to a common control member in the form of a detent spool 406, shown more particularly in Figures 19, 20 and 21. The rate valve plunger 321 is connected by a double ball-ended lever 407 to the spool 406 in such a manner that rotation of the spool will effect reciprocation of the valve plunger. As previously explained, the direction valve plunger 297 and the directional interlock valve plunger 329 are inter-connected by the lever 330 for simultaneous operation, this lever having a ball-ended arm engaging a socket 408 formed in the periphery of the spool 406 whereby upon axial movement of the spool the lever 330 will be rotated to effect shifting of the valve plungers in their respective directions. The spool 406 is adapted to be oscillated to three different positions and axially moved to two different positions, thereby making a total of six positions, by the manually operable lever 409 having a ball-shaped portion 410 by which it is supported for universal movement in a fixed part of the machine. The various positions which this lever may assume are shown in Figures 9 to 14 respectively. In Figure 9 the lever is moved to the left, and down to an extreme lower position which means that the spool 406 is rotated in such a direction as to lift the valve plunger 321 to the position shown in Figure 31, and the plungers 329 and 297 to the position shown in Figure 28 corresponding to stop. In Figure 10, the lever 409 is shown raised from the position shown in Figure 9 to a position which yields feed left of the table. Since this movement merely rotates the spool 406, the plungers 329 and 293 will remain in the same position as shown in Figure 28 and the plunger 321 will be lowered to the feed position shown in Figure 30. In Figure 11, lever 409 is raised above a central position but it will be noted it still extends in a direction which is toward the left from a vertical center line passing through the pivot point of the lever. This position yields a quick traverse movement toward the left, and since its only effect is to rotate the spool 406 to move the plunger 321 to the position shown in Figure 28, the position of plungers 329 and 293 will not be changed. Attention is invited to the fact that in Figures 9, 10 and 11, the lever 409 points toward the left thereby making the lever a directional control lever. In Figures 12, 13 and 14 the lever is in a position to the right of a vertical center line, thereby indicating that any movements of the table will be in that direction. In Figure 12 the lever is in a quick traverse right position which means that the only change from the position of the parts indicated in Figure 11, is that the detent spool has been moved longitudinally which still leaves the valve plunger 321 in the position shown in Figure 28 and the plungers 329 and 293 in the positions shown in Figure 30. Downward movement of the lever to the position shown in Figure 13 will cause the table to feed toward the right which is effected by an upward movement of the plunger 321 from the position shown in Figure 28 to the position shown in Figure 30. In Figure 14, the handle 409 is moved downward to a second stop position and the only change in the position of the valve plungers is shown in Figure 31 where the plunger 321 is moved to its extreme upward position.

A mechanical detent mechanism more particularly shown in Figure 24 is provided for holding the detent spool in any one of the three positions to which it may be oscillated. Spool 406 has an integral portion 411 in which is formed three notches 412, 413 and 414 engageable by the detent 415 which is continually held in position by a spring 416 acting through a plunger 417 on an integral lug 418 projecting from the side of the lever 415. The notches 412, 413 and 414 are elongated as shown in Figures 20 and 21 so that the spool may be reciprocated without losing contact with the detent 415. The detent mechanism for positioning the spool axially is included in the hydraulic detent mechanism described in connection with the spool 294 of plunger 297. In other words, the minute the spool 294 passes a central position the hydraulic pressure will continue the movement, and this movement is limited by a pin 419 more particularly shown in Figures 21 and 23, which is mounted in a fixed part of the machine and projecting into a depression 420 formed in the side of the spool. This depression is of sufficient width that the spool may be rotated without interference therefrom and is of the desired length to properly position the valve plungers 293 and 329. It will thus be seen that the detent spool 406 may be moved to six different positions and that suitable detent mechanism has been provided for retaining it in these various positions.

The detent spool is also adapted to be automatically moved to any one of these six positions by an oscillatable and rotatable trip plunger 421. The plunger 421 is mounted in the control bracket 153 which is positioned at the side of the bed of the machine as shown in Figure 15 so that the plunger projects horizontally toward the side of the table. The outer end of the plunger has a flat surface 422 on the upper side from which projects a pair of lugs 423 and 424. As shown in Figures 12, 13 and 14 the lug 423 is projecting substantially vertical while the lug 424 is in an inoperative position, but when the plunger 421 is rotated to any one of the positions shown in Figures 9, 10 and 11 the lug 423 is moved to a substantially inoperative position and the lug 424 is moved to an operative position for contact with suitable dogs carried by the table. The lugs 423 and 424 serve to automatically position the plunger 421 axially. Rotation of the plunger is effected by a second pair of lugs 425 and 426 formed on the underside of the plunger, and when the plunger is in one position one lug projects further than the other one for contact with suitable dogs, and vice versa. The trip dogs for actuating the plunger 421 are mounted on a dog rail 427 which is removably attached to the side of the table. As shown in Figure 15 the T-slots 428 and 429 are formed on the underside of the dog rail and the slot 429 carries the dogs for controlling the movement of the table when the table is moving toward the left and the dogs mounted in the other T-slot 428 control the movement of the table when travelling toward the right.

A stop plunger 430 is reciprocably mounted in parallel relation to the plunger 421 in the control bracket 153 and is normally maintained in a projected position by a spring 431 acting on the rear of the plunger and outward movement of the plunger is limited by a shoulder 432 engaging a fixed part of the control bracket. This plunger carries a pivot pawl 433 which has a loose fit on a pin 434 whereby the pawl may not only pivot but be capable of a small amount of bodily movement relative to the plunger 430. The end of this pawl engages a lever 435 which has a ball-ended lug 436 projecting therefrom into an annular groove 437 formed in the periphery of the plunger 421 so that upon retraction of plunger 430 the tripping plunger 421 will be moved axially to the position shown in Figures 9 and 14. A spring pressed pin 438 carried by the plunger 430 normally maintains the pawl 433 in a position to engage the lever 435. The construction here is also of such a nature that if the plunger 421 has been moved to a stop position automatically, it may be manually moved again to either one of its operating positions without manually moving the table out of position with respect to the plunger 430. This means consists of a fixed member 439 adaptable to engage the upwardly projecting end of the pawl 433 so that during the final movement of plunger 430 and after the plunger 421 has been moved sufficiently to cause the detent mechanism to finally position it, the pawl 423 will be oscillated about the pin 434 so that the lower end of the pawl will move out of engagement with the lever 433. It is thus possible to manually re-engage the table feed, for instance, while the trip dog is still holding the stop plunger 430 in a retracted position.

This stop dog, as well as the trip plunger control dogs, is carried by the removable dog rail and a plurality of these rails may be provided if so desired, for the machine having control dogs positioned thereon to give different cycles of operation of the machine so that instead of the operator shifting several dogs to change the machine cycle, it is only necessary to replace one dog rail by another. In this connection attention is also invited to the fact that the dog rail projects horizontally from the side of the table and that the dogs are on the underside of the rail, which construction serves to protect the dogs from falling chips and prevent the possible interference with the accuracy of operation of the machine.

A typical set-up of the dogs on the rail is shown in Figure 32, which set-up is capable of yielding a continuously reciprocating cycle with feed and rapid traverse movements in both directions, and is to be considered merely as illustrative of one of the possible combinations, it being evident to those skilled in the art that these dogs, together with others to be explained, may be suitably positioned to yield other cycles, depending upon the work to be performed by the machine. The reverse dog 440 is secured in the rear T-slot 429 of the dog rail and as more particularly shown in Figure 33 is substantially similarly shaped, one leg 441 of the channel constituting the operating portion, engaging the lug 426 of plunger 421. Since this dog engages a lug 426 it serves to change the direction of movement of the table from left to right. It will also be noted that this operating portion 441 is of sufficient length to engage the lug 426 regardless of whether the plunger 421 is in a feed position or a rapid traverse position. This will rotate the plunger 421 to either one of the positions shown in Figures 12 and 13 so that the lug 423 is presented for operation by the dogs carried in slot 428. Usually the plunger will be in a quick traverse position corresponding to Figure 12 so that the work will be moved rapidly toward the cutter. As the work approaches the cutter, a dog such as 442 may be positioned in a T-slot 428 for moving the plunger axially from the position shown in Figure 12 to the position shown in Figure 13, the dog having an inclined portion 443 for effecting this change. At the completion of the cutting movement, a second dog 444 may be fastened in T-slot 428 for moving the plunger axially from the position shown in Figure 13 to the position shown in Figure 12. The table will now travel toward the right at a rapid rate until a second reverse dog 445 carried in the T-slot 429 engages the depending lug 425 on plunger 421 to rotate it and thereby change the direction of table movement. It will be noted that the operating rack portion 446 of this dog is longer than the operating leg portion 441 of the reverse dog 440 which is for the reason that the lug 425 is positioned further from the table on the plunger 421 than is the lug 426. Additional dogs 447 and 448 may be positioned in the T-slot 429 for controlling the rate of movement of the table in an opposite direction.

Should it be desirable to stop the table at an intermediate point in its travel or at one end of its stroke, a stop dog 449 having an angularly beveled face 450 may be applied for engaging the stop plunger 430.

In addition to automatically controlling the rate and direction of table movement, other types of dogs may be applied to the dog rail for controlling the direction of spindle rotation. These dogs are of different types and coact with a pair of plungers 451 and 452 shown more particularly in Figure 17. These plungers are inter-connected for simultaneous movement by a double-ended ball crank 453 which is keyed to the upper end of shaft 159 to the lower end of which is operatively connected the electrical reversing switches 82 and 83. It will be recalled that the closing of one of these switches will cause rotation of the spindle in one direction and closing of the other switch will cause rotation of the spindle in an opposite direction, but if both switches are open the cutter spindle will be stopped. Additionally, it will be recalled that during automatic operation of the machine, that after one of these switches is closed it may be opened without producing any effect, which makes it possible when the switch 93 is closed for automatic operation of the machine to change the position of switches 82 and 83, or in other words to preposition these switches while the spindle is still rotating in one direction, or the other, due to the automatic closure of switch 118 or 131. The control dogs for controlling the plungers 451 and 452 may thus be set to directly and immediately effect a change in the direction of rotation of the spindle or a stop thereof when the switch 91 is closed for manual operation, or they may be set to preposition the switches 82 and 83 so that upon the next opening and closing of switch 96 the direction of rotation of the spindle will be automatically reversed.

The shaft 159 has a detent plate 454 keyed to the upper end thereof in which is formed three notches 455, 456 and 457 engageable by a spring pressed detent 458. This detent mechanism serves to hold the shaft in any one of its three positions. To prevent interference between the control dogs the plunger 451 has the upper half removed and the plunger 452 has the lower half removed. This is more particularly brought out in Figures 35 and 36 and the control dogs 459 and 460 are correspondingly formed so that each will engage its respective plunger without inadvertently engaging the other. As shown in Figure 37, these dogs may project a sufficient amount to move the respective plunger from one extreme position to the other such as when effecting a reversal in spindle rotation or only a sufficient amount to move the plunger one-half of its travel or to a position such as shown in Figure 17 corresponding to a stop position.

It will thus be seen that various combinations of dogs may be applied to the dog rail to produce almost any conceivable cycle within the range of operation of this machine.

In conclusion, attention is invited to the fact that the feed box 167 is built as a unit for insertion in the bed of the machine, and that the various fluid channels which control the operation of the several movable parts in the feed box and permanently connected thereto may have their free ends connected to a header plate which may be secured in an opening in one side of the bed or secured to an opening in the opposite side of the bed depending upon the position of the headstock or column 33 of the machine. If the column is positioned at the side of the machine shown in Figure 3, the control bracket will be attached to the opposite side of the bed while the position of these parts will be reversed if for any reason the column 33 should be mounted in a reverse position to that shown in Figure 3. The control bracket 153 also carries a plate having a plurality of fluid channels connected thereto and so positioned that upon application of the control bracket to the side of the bed the control channels in the bed will be automatically connected to the proper control channels in the bracket. If so desired the various flow channels extending from the feed box may each be provided with a T-connection thus dividing each channel into two branches whereby one set of branches may be connected to a header located in one wall of the bed and the other set of branches connected to a second header mounted, at a spaced point in the first head such as in the opposite wall of the bed, so that the control bracket may be selectively applied to either side of the bed. In such a case a cover plate with suitable leakage preventing packing may be applied to the unused header to prevent flow from the open ended channels therein.

What is claimed is:

1. In a milling machine having a support and a work table mounted on the support, the combination of transmission mechanism for determining movement of the table including shiftable parts selectively positionable to cause a feeding movement or a quick traverse movement of the table, said parts also being positionable to stop the table, a trip plunger operatively connected to said parts and axially movable to three different positions to effect the different results, said plunger being mounted for horizontal movement toward and from the side of the table, trip dogs carried by the table for moving the plunger selectively from either one of two positions to the other thereof, and means including an additional trip operable mechanism having a motion transmitting connection to the plunger, and additional trip dogs carried by the table for co-acting with said last named mechanism to shift the plunger to a third position.

2. In a machine tool having a support and a work table mounted on the support, the combination of transmission mechanism for the table including shiftable parts for determining the rate and direction of said movement, and a trip plunger operatively connected to said parts and mounted for horizontal movement toward and from the table, said plunger being oscillatable to two positions and axially movable to three positions, a mechanical detent for retaining the plunger in its various axial positions, an hydraulic detent mechanism for retaining the plunger in its other two positions, trip dogs carried by the table for oscillating the plunger, and additional trip dogs for shifting the plunger axially from one of its axial positions to either of its other positions.

3. In a milling machine having a support and and a work table mounted on the support, the combination of transmission mechanism including a shiftable part engageable to cause movement of the table, a first plunger operatively connected for shifting said part, a stop plunger trip operable by the table for shifting said first plunger to cause disengagement of the part and thereby stoppage of the table, said stop plunger including a spring pressed latch normally in a position to engage said plunger to effect movement thereof, manual means for moving said first plunger to cause re-engagement of the shiftable part, and means carried by the first plunger for automatically tripping said latch to permit said re-engagement while the stop plunger is held in a retracted position.

4. In a machine tool having a movable support and transmission mechanism for effecting movement thereof, the combination of hydraulic mechanism for controlling said transmission including a rate determining valve, a direction determining valve and an interlock valve interposed between the rate valve and the direction valve, a single member for operating all of said valves, one direction of movement of the member controlling the position of the direction valve, and a lever mechanism interconnecting the direction valve with the interlock valve for simultaneous movement therewith.

5. A machine tool having a movable support, transmission mechanism therefor including a shiftable member for changing the direction of movement of the support, fluid operable means for shifting said reverser including a control valve, parallel channels extending from the valve to said means, said transmission including a backlash eliminator having a part selectively fluid operable in one direction to eliminate backlash during movement of the table in one direction, or fluid operable in the other direction to eliminate backlash during opposite movement of the table, and branch lines extending from the respective channels to the back lash eliminator for automatically changing the effect thereof upon change in the direction of table movement.

6. A machine tool having a movable support, a transmission therefor including a fluid operable clutch for causing rapid traverse movement thereof, a channel for supplying fluid pressure to said clutch, a reversing clutch for changing the direction of table movement, and means operable by the reversing clutch during shifting movement thereof to close said channel whereby the rapid traverse clutch will be rendered ineffective until the reversing clutch has completed its movement.

7. In a machine tool having a movable support and a transmission therefor, the combination of hydraulic control mechanism for said transmission including a direction determining valve, a final drive shaft to the support, a brake for said shaft, and power means operable by the valve upon movement to change the direction of rotation of said shaft to apply said brake momentarily whereby the shaft will be substantially stopped when the reverse is effected.

8. In a machine tool having a movable support, the combination of a transmission for effecting said movement including a drive shaft, a driven shaft, a feed transmission and a rapid traverse transmission extending in parallel between said shafts, an overrunning clutch connecting the feed transmission with the driven shaft, a rapid traverse clutch for coupling the drive shaft to the driven shaft, and a feed clutch for connecting said driving shaft to the feed transmission, fluid operable means for shifting said clutches including a rate valve having a first position causing engagement of the rapid traverse clutch, a second position causing disengagement of the rapid traverse clutch and thereby movement of the table at a feed rate, and a third position to effect disengagement of the feed clutch and thereby stoppage of the table.

9. In a machine tool having a movable support, a transmission for effecting said movement including a drive shaft, a driven shaft, a feed transmission and a rapid traverse transmission extending in parallel between said shaft, an overrunning clutch connecting the feed transmission with the driven shaft, a rapid traverse clutch for coupling the drive shaft to the driven shaft, and a feed clutch for connecting said drive shaft to the feed transmission, fluid operable means for shifting said clutches including a rate valve having a first position causing engagement of the rapid traverse clutch, a second position causing disengagement of the rapid traverse clutch and thereby movement of the table at a feed rate, a third position to effect disengagement of the feed clutch and thereby stoppage of the table, a fluid operable brake associated with the feed transmission, and fluid connections for automatically applying said brake upon disengagement of the feed clutch.

10. In a milling machine having a support, a work table reciprocably mounted thereon, a tool spindle carried by the support, a transmission for said spindle including an electrical control switch having a first position for causing rotation of the spindle, and a second position for stopping the spindle, a transmission including a fluid shiftable part for determining fast and slow movements of the table, a valve for controlling the movement of said part, and means controlled by said valve for positioning said switch in accordance with the rate of movement of the table whereby the spindle will rotate during one rate of table movement and be at rest during the other rate of table movement.

11. In a milling machine having a support, a work table reciprocably mounted thereon, a tool spindle carried by the support, a transmission for said spindle including an electrical control switch having a first position for causing rotation of the spindle, and a second position for stopping the spindle, a transmission including a fluid shiftable part for determining fast and slow movements of the table, a valve for controlling the movement of said part, means controlled by said valve for positioning said switch in accordance with the rate of movement of the table whereby the spindle will rotate during one rate of table movement and be at rest during the other rate of table movement, and an additional switch in series with the first named switch to change the direction of rotation of the spindle.

12. In a milling machine having a support, a work table reciprocably mounted thereon, a tool spindle carried by the support, a transmission for said spindle including an electrical control switch having a first position for causing rotation of the spindle, and a second position for stopping the spindle, a transmission including a fluid shiftable part for determining fast and slow movements of the table, a valve for controlling the movement of said part, means controlled by said valve for positioning said switch in accordance with the rate of movement of the table whereby the spindle will rotate during one rate of table movement and be at rest during the other rate of table movement, an additional switch in series with the first named switch to change the direction of rotation of the spindle, and selective means including a manual control lever and a trip actuable part for operating said last named switch whereby the direction of rotation of the spindle may be manually or automatically controlled.

13. In a milling machine having a support, a work table reciprocably mounted thereon, a tool spindle carried by the support, a transmission for said spindle including an electrical control switch having a first position for causing rotation of the spindle, and a second position for stopping the spindle, a transmission including a fluid shiftable part for determining fast and slow movements of the table, a valve for controlling the movement of said part, means controlled by said valve for positioning said switch in accordance with the rate of movement of the table whereby the spindle will rotate during one rate of table movement and be at rest during the other rate of table movement, and means to render said switch ineffective for controlling spindle rotation.

14. In a machine tool having a work support and a tool spindle, the combination of a transmission for the work support, a separate transmission for the tool spindle, first main circuit including an alternating current prime mover for one of said transmissions, a second main circuit including a direct current prime mover for the other transmission, two holding circuits, a common means for breaking both of said holding circuits, and means responsive to an overload condition in either of said main circuits for operating said common means.

15. In a transmission for the work support of a milling machine, the combination of a first and a second shaft mounted in coaxial relationship, one of said shafts being operatively connected to the work support, a change speed transmission, a clutch for coupling the change speed transmission for actuation of the first shaft, an overrunning clutch interconnecting the opposite ends of said shafts whereby the second shaft will be driven at the same rate as the first shaft, and an additional clutch coupling the second shaft for actuation at a rapid traverse rate while the first two clutches are operatively engaged.

16. In a transmission for the work support of a milling machine, the combination of a first and a second shaft mounted in coaxial relationship, one of said shafts being operatively connected to the work support, a change speed transmission, a clutch for coupling the change speed transmission for actuation of the first shaft, an overrunning clutch interconnecting the opposite ends of said shafts whereby the second shaft will be driven at the same rate as the first shaft, an additional clutch coupling the second shaft for actuation at a rapid traverse rate while the first two clutches are operatively engaged, and means adjacent the opposing ends of said shafts for synchronizing their rates of rotation when said additional clutch is disengaged.

17. In a transmission for the work support of a milling machine, the combination of a first and a second shaft mounted in coaxial relationship, one of said shafts being operatively connected to the work support, a change speed transmission, a clutch for coupling the change speed transmission for actuation of the first shaft, an overrunning clutch interconnecting the opposite ends of said shafts whereby the second shaft will be driven at the same rate as the first shaft, an additional clutch coupling the second shaft for actuation at a rapid traverse rate while the first two clutches are operatively engaged, means adjacent the opposing ends of said shafts for synchronizing their rates of rotation when said additional clutch is disengaged, a final drive shaft, a reverser for coupling the second shaft to the final shaft, and fluid operable means for shifting said reverser.

18. In a milling machine transmission for reciprocating a work support thereof, the combination of a feed clutch consisting of an input member and an output member, a brake associated with the output member, fluid operable means for actuating said clutch and brake, an interlock to effect release of the clutch automatically upon application of fluid pressure to the brake, and resilient means for reconnecting the clutch upon release of pressure from said brake.

19. In a machine tool having a support, a part movably mounted on said support, the combination of means for effecting said movement including a feed box having a plurality of control clutches, brakes, and reversing mechanism, fluid operable means self-contained in the box for operating the various control devices, a plurality of individual flexible flow channels for conducting fluid to the several devices, a final hydraulic control unit selectively positionable at spaced points on the machine, and means to couple said channels to the unit in any position thereof without disturbing said feed box.

20. In a machine tool having a support, a part movably mounted on said support, the combination of means for effecting said movement including a feed box having a plurality of control clutches, brakes, and reversing mechanism, fluid operable means self-contained in the box for operating the various control devices, a plurality of individual flexible flow channels for conducting fluid to the several devices, a final hydraulic control unit selectively positionable at spaced points on the machine, means to couple said channels to the unit in any position thereof without disturbing said feed box, said last named means including a multiport terminal block associated with a control unit, and a multiport terminal block to which the ends of said flexible channels are connected, and means to operatively connect said blocks whereby the respective flexible channels will be properly connected with their respective control parts in the control unit.

21. In a machine tool having a tool spindle and a work support movable relative thereto, the combination of electrical means for rotating the spindle including a reversing switch, a transmission for the work support including a feed clutch, means trip operable by the table for actuating said reversing switch, and means controlled by the switch when thrown to a stop position to disconnect said feed clutch.

22. A milling machine having a tool spindle and a work support, transmission mechanism for actuating the work support, a transmission for actuating said spindle, fluid operable means for controlling the feed rate of said work table transmission, electrically operable means for controlling the starting and stopping of the spindle transmission, a centralized control unit for both of said control means, and interlocks therebetween to prevent feeding movement of the table when the spindle is stopped.

23. In a machine tool having a reciprocable work table and means to support the table including a wall spaced therefrom and extending in a direction parallel to the direction of table reciprocation, the combination with a transmission having shiftable parts for determining the effect thereof on the table, of means for automatically controlling the position of said parts from the movement of the table including a trip plunger and a dog rail extending from the wall and from the edge of the table respectively in over-lapping relation, trip dogs depending from the under side of the rail cooperating with portions projecting from the top side of the plunger to effect axial movement thereof toward and from the edge of the table, other dogs depending from said rail cooperating with the other portions depending from the under side of the plunger for effecting oscillation thereof, and means differently connecting with the plunger for shifting different parts of the transmission for the different respective movements of the plunger.

24. In a machine tool having a support, a work table mounted for reciprocation on said support and a transmission including shiftable parts for determining the rate and direction of support movement, the combination of means for automatically controlling the shifting of said parts from the table including a trip plunger supported for axial movement toward and from the edge of said table, said plunger also being oscillatable, a spool operatively connected with the plunger for oscillation by axial movement of the plunger and axially movable by oscillation of the plunger, means operatively connecting the spool for shifting certain of said parts upon axial movement of the plunger, and additional means operatively connecting the spool for shifting other of said parts upon oscillation of the plunger.

25. In a machine tool having a work support and a transmission for power moving the same, said transmission including shiftable parts for determining rate and direction, the combination of control means for said transmission including a trip plunger axially movable toward and from the table to two different positions, said plunger being operatively connected to the transmission whereby these positions will yield a feed rate and a rapid traverse rate respectively, said plunger also being oscillatable between two positions and operatively connected to the transmission whereby these last two named positions will determine different directions of table movement, and means to shift said plunger axially to a third position beyond said first two named positions, and means operatively connecting said plunger to the transmission whereby upon movement to said third position the table will be stopped.

26. In a milling machine having a work table and a rotatable tool spindle, the combination of a transmission for said spindle including an electrical prime mover which is reversible for changing the direction of rotation of the spindle, an electrical control circuit for said prime mover including a reversing switch mechanism, a rotatable part for shifting said mechanism, and means trip controlled by the table for shifting said part to automatically change the direction of rotation of the spindle from the movement of the table.

27. In a milling machine having a work table and a rotatable tool spindle, the combination of a transmission for said spindle including an electrical prime mover which is reversible for changing the direction of rotation of the spindle, a control circuit including a reversing switch for determining the direction of spindle rotation, a starting switch, trip controlled means operable by the table for shifting said starting switch to different positions in accordance with the rate of movement of said table whereby the spindle may be stopped during one rate of movement of the table and running during a different rate of movement of the table, and an auxiliary switch for rendering the starting switch ineffective for control of said prime mover.

28. In a milling machine having a work table and a rotatable tool spindle, the combination of a transmission for said spindle including a prime mover, a control circuit for said prime mover including a first switch mechanism which is manually operable to start and stop the spindle and determine its direction of rotation, a trip operable control switch having two positions for starting and stopping the spindle, and a selector switch for connecting and disconnecting the last named switch whereby rotation of the spindle may be selectively controlled automatically or manually.

29. In a machine tool having a movable support, a transmission mechanism for effecting movement thereof, the combination of hydraulic mechanism for controlling said transmission including a rate determining valve, a direction determining valve and an inter-lock valve interposed between the rate valve and the direction valve, a single member for operating all of said valves, said member being oscillatable and rotatable, means operatively connecting the member whereby one of said movements will control the position of the direction valve, the other of said movements will control the position of the rate valve, and means operatively connecting the direction valve with the interlock valve for simultaneous movement therewith.

30. In a machine tool having a movable support and a transmission for effecting feeding and quick traverse movements of the support, said transmission including a rapid traverse clutch, a rapid traverse brake and a reverser, the combination of control means therefor including fluid operable means for shifting the respective devices, a control valve having two positions in each of which it simultaneously couples pressure to the rapid traverse clutch and connects the rapid traverse brake to reservoir, a shiftable control part for determining operation of the reverser, means coupling the control valve to said part for movement from one of its normal positions to the other upon each shift of said part, and means operable by the control valve to momentarily reverse the connections to said clutch and brake during its shifting movement.

31. In a milling machine having a movable support the combination of transmission mechanism for effecting movement thereof, a tool spindle mounted in cooperative relation to said support, transmission means for said spindle control means effective on said first named transmission for simultaneously changing the rate and direction of movement thereof and including a part shiftable to stop rotation of the spindle and adjustable means to variably delay the movement of said part whereby rotation of the spindle will continue until after the reversal of the support is completed.

32. In a machine tool having a work support and a tool support, the combination of transmission mechanism for effecting relative movement between the supports including a power shaft, a second shaft, clutch means selectively positionable for coupling the drive shaft for actuation of the second shaft at feed or quick traverse rates, additional clutch means for coupling the second shaft for advance or return of the movable support, fluid operable device for shifting said clutch means, and valve control means therefor including a plunger having a quick traverse position, a feed position and a stop position in the order named.

33. In a machine tool having a work support and a tool support, the combination of transmission mechanism for effecting relative movement between said supports including a feed clutch, a rapid traverse clutch, and a reverser; means for shifting said clutches including a six-position control lever having a first pair of positions for producing quick traverse forward and quick traverse return; a second pair of positions for yielding feed forward and feed return, and a third pair of positions, each of which will stop said relative movement.

34. In a machine tool having a movable support and a fixed support, one of which is adapted to carry a tool and the other a work piece; transmission mechanism for effecting relative movement between the supports, hydraulic mechanism for controlling said transmission including a rate determining valve, a direction determining valve and an interlock valve; a single control member for operating said valves, said member having a first directional movement for positioning the direction valve; and motion transmitting means interconnecting the directional valve with the interlock valve for simultaneous movement therewith.

35. In a machine tool having a work support and a tool support, the combination of a transmission mechanism for effecting relative movement therebetween including a direction determinator, a fluid operable brake, a source of pressure, a direction determining valve, and means in the valve during movement thereof to reverse the pressure on said direction determinator to cause a momentary delivery of fluid to said brake whereby the transmission mechanism will be substantially stopped when the direction determinator is reconnected.

36. In a milling machine having a work table and a tool spindle, the combination of a transmission for effecting relative movement between the table and spindle at feed and quick traverse rates, a second transmission for rotating the spindle, manually operable means for controlling the effect of said second transmission on the spindle, additional means automatically controlled from the table for determining said effect, and a selector for determining between manual and automatic control of said spindle.

37. In a machine tool having a tool spindle and a work support, the combination of transmission means for effecting relative movement between the spindle and support at feeding rates, a power transmission for effecting rotation of the spindle including a motion interrupter, a second motion interrupting means for stopping the table, a single member trip operable by the table for actuating both of said motion interrupting means, and means for delaying operation of said first-named interrupter whereby said spindle will always stop after the relative movement between the table and spindle has ceased.

38. In a machine tool having a tool support and a work support, the combination of a mechanical transmission for feeding said support in opposite directions, a backlash eliminator including a shiftable part having a first position for conditioning said eliminator to remove backlash from said transmission during one direction of movement thereof, and a second position for eliminating backlash during opposite direction of movement thereof; a control member shiftable to change the direction of feed, and means automatically operable for shifting said part to change the effect of said eliminator.

39. A machine tool having a reciprocable support, power operable means for moving said support at different rates in either direction, means to disconnect said power operable means to stop the support and a fluid operable backlash eliminator operatively connected to said means including a control valve means trip operable by the support to render said eliminator effective during one of said rates and when the support is stopped, but ineffective during movement of the support at another of said rates.

40. In a machine tool having a reciprocable support, the combination of power operable means for moving said support at a quick traverse rate, manually operable means for moving said support, a fluid operable backlash eliminator and a control valve means automatically operable upon actuation of said power operable means at a quick traverse rate to render said backlash eliminator ineffective during quick traverse movement of the support and means automatically operable upon stoppage of said power operable means to render said backlash eliminator effective during manual operation of said support.

MILLARD ROMAINE.
WALTER D. ARCHEA.
ERWIN G. ROEHM.